US012764453B2

(12) United States Patent
Ayzenberg et al.

(10) Patent No.: US 12,764,453 B2
(45) Date of Patent: Oct. 13, 2026

(54) SECURE AND/OR COMFORTABLE RETENTION OF AN EARBUD THROUGH A RETAINER CONTACTING THE CONCHA OF THE EAR

(71) Applicant: Stealth Labs Inc., Brookline, MA (US)

(72) Inventors: Yadid Ayzenberg, Brookline, MA (US); Amir Lazarovich, Apex, NC (US); Adam Sebastian Sanchez, Wantage, NJ (US); Marcus Z. Williams, West Orange, NJ (US); Mathieu Zastawny, Jersey, NJ (US)

(73) Assignee: Stealth Labs Inc.

( * ) Notice: Subject to any disclaimer, the term of this patent is extended or adjusted under 35 U.S.C. 154(b) by 125 days.

(21) Appl. No.: 18/529,243

(22) Filed: Dec. 5, 2023

(65) Prior Publication Data

US 2025/0184650 A1 Jun. 5, 2025

(51) Int. Cl.
*H04R 1/10* (2026.01)

(52) U.S. Cl.
CPC ........... *H04R 1/105* (2013.01); *H04R 1/1016* (2013.01)

(58) Field of Classification Search
CPC .............................. H04R 1/105; H04R 1/1016
See application file for complete search history.

(56) References Cited

U.S. PATENT DOCUMENTS

| | | | | |
|---|---|---|---|---|
| 6,810,987 | B1 * | 11/2004 | DeKalb | H04R 1/105 381/328 |
| 7,986,803 | B1 | 7/2011 | DeKalb | |
| 8,311,253 | B2 | 11/2012 | Silvestri et al. | |
| 9,532,127 | B2 | 12/2016 | Burton | |
| 9,648,408 | B2 | 5/2017 | Korch-Haahr et al. | |
| 11,082,766 | B1 | 8/2021 | Bar Lev | |
| 2013/0301845 | A1 | 11/2013 | Royal | |
| 2014/0205125 | A1 * | 7/2014 | Triato | |
| 2017/0339481 | A1 | 11/2017 | Laberge | |
| 2023/0164472 | A1 | 5/2023 | Keady | |
| 2023/0300516 | A1 | 9/2023 | Betlehem et al. | |
| 2025/0330740 | A1 * | 10/2025 | Graft et al. | |

* cited by examiner

*Primary Examiner* — Fan S Tsang
(74) *Attorney, Agent, or Firm* — Peter Jensen-Haxel

(57) ABSTRACT

Disclosed are a method, a device, and/or a system of secure and/or comfortable retention of an earbud through a retainer contacting the concha of the ear. In one embodiment, a retainer for an earbud includes an arm extending at least partially from an aft portion of the earbud and configured to contact a concha of the ear when the earbud is seated in an ear, and a hinge element that is configured to permit at least a first portion of the arm to hinge away from the concha. The hinge element resists hinging away from the concha with a restoring force, such that when the earbud is seating in the ear the arm pushes from the concha and/or an interior surface of an anti-helix of the ear to apply force toward a front portion of the earbud and/or an ear tip of the earbud, to comfortably retain the earbud.

20 Claims, 13 Drawing Sheets

SECURE AND/OR COMFORTABLE RETENTION OF AN EARBUD THROUGH A RETAINER CONTACTING THE CONCHA OF THE EAR

FIELD OF TECHNOLOGY

This disclosure relates generally to personal audio devices and earbuds, and, more particularly, to a method, a device, and/or a system of secure and/or comfortable retention of an earbud through a retainer contacting the concha of the ear.

BACKGROUND

Earbuds that are held in place by the shape of the ear of a user and that provide sound directly to an ear canal become prevalent personal devices. The attractiveness, comfort, and retention security are increasingly valued in both business and consumer markets.

In some cases, retention security and comfort may be opposed principles. For example, it is possible to construct a retention mechanism that has high retention security by creating a very tight fit in the ear and/or wrapping around portions of the ear, which may decrease comfort due to the extra contact surfaces or parts of the ear. Conversely, a soft, minimalistic earbud may be comfortable, but lack the retention capability. Still other retention mechanisms may be relatively comfortable in some contexts and/or for some use cases, but example as long as no external force or pressure is placed on the ear and/or earbud.

Comfort and retention security also may be challenging in certain contexts. For example, certain retension mechanisms and/or earbud form factors may be uncomfortable if force and/or pressure is applied against the ear. A user wearing an earbud may experience discomfort from the earbud and/or the retention mechanism when pressure is applied against the ear by headwear such as helmets, earmuffs, and/or headband. Similarly, retention security can be important when removing such headwear. Otherwise, the earbud may become unseated and possibly fly out of the ear which can result in the earbud becoming lost or damaged. Another example in which pressure may be applied against the ear and/or earbud may occur when a user rests their head against a surface, for example a user sleeping on their side (sometimes known as a “side sleeper”). Earbud comfort during resting can be important if the user needs to use the earbuds in to help achieve sufficient rest. Earbuds may also be usable for aiding in sleep by playing masking noises, providing noise canceling, collecting physiological data to determine sleep state. Therefore, it may be of value to help ensure that the earbuds are secured throughout the intended rest period of the user (e.g., a nap, an entire nights’ sleep). Otherwise, the earbuds may become unseated, which may result in the user being disturbed by environmental noise from which they would otherwise have been shielded.

It is therefore advantageous to find new, comfortable and secure retention mechanisms for earbuds that are attractive, comfortable, and/or secure, including without limitation those with specialized uses such as headwear and/or aiding in sleep.

SUMMARY

Disclosed are a method, a device, and/or a system of secure and/or comfortable retention of an earbud through a retainer contacting the concha of the ear. In one embodiment, a retainer for comfortably securing an earbud in an ear of a user includes an arm extending at least partially from an aft portion of the earbud and configured to contact a concha of the ear when the earbud is seated in the ear, and a hinge element that is configured to permit at least a first portion of the arm to hinge away from the concha. The hinge element resists hinging away from the concha with a restoring force, such that when the earbud is seating in the ear the arm pushes off of the concha and/or an interior surface of an anti-helix of the ear to apply force toward (i) a front portion of the earbud and/or (ii) an ear tip of the earbud, to comfortably retain the earbud.

The arm may include a flexible material configured to shear relative to the hinge element when an upward force and/or a downward force is applied to the earbud and/or the retainer, to improve comfort of the earbud if the earbud moves while seated in the ear. The first portion of the arm and/or a second portion of the arm may follow a curvature of the concha. The first portion of the arm and/or the second portion of the arm may follow the curvature of the concha at least to the interior surface of the anti-helix of the ear.

The curvature of the concha may be followed by the first portion of the arm, and/or the second portion of the arm may include a horizontal curvature when projected into the an x-y plane of the ear. The retainer may include a break zone and/or a break axis configured to assist in collapsing the arm at least partially against the aft portion of the earbud when a forward force is applied to the retainer and/or a backward force is applied to the earbud, to improve the comfort of the earbud if the earbud moves while seated in the ear.

The arm may extend from the earbud at an upward angle toward a top of the ear of the user when seated in the ear. The arm may extend from the earbud at an inward angle toward an interior of a head of the user when the earbud is seated in the ear. The upward angle may be between 5 degrees and 60 degrees from an x-axis of the earbud toward a z-axis of the earbud, and the inward angle may be between 5 degrees and 60 degrees from the x-axis of the earbud toward a y-axis of the earbud. The arm may extend from an edge of the earbud between and/or including the aft portion of the earbud and an interior facing of the earbud.

In another embodiment, an earbud includes a housing of the earbud and an arm extending at least partially from an aft portion of the earbud and configured to contact a concha of the ear when the earbud is seated in the ear. The arm may be configured to permit at least a first portion of the arm to hinge away from the concha. The hinge element may resist hinging away from the concha with a restoring force, such that when the earbud is seating in the ear the arm pushes off of of the concha and/or an interior surface of an anti-helix of the ear to apply force toward (i) a front portion of the earbud and/or (ii) an ear tip of the earbud, to comfortably retain the earbud when the ear rests against a surface.

In yet another embodiment, a boot for an earbud includes an arm extending at least partially away from an aft portion of the earbud when the boot is secured to the earbud, the arm configured to contact a concha of the ear when the earbud is seated in the ear and permit at least a first portion of the arm to hinge away from the concha. The hinge element resists hinging away from the concha with a restoring force, such that when the earbud is seating in the ear the arm pushes off of the concha and/or an interior surface of an anti-helix of the ear to apply force toward (i) a front portion of the earbud and/or (ii) an ear tip of the earbud, to comfortably retain the earbud when the ear rests against a surface.

BRIEF DESCRIPTION OF THE DRAWINGS

The embodiments of this disclosure are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device, and/or system of secure and/or comfortable retention of an earbud through a retainer contacting the concha of the ear. Although the present embodiments have been described with reference to specific example embodiments, it will be evident that various modifications and changes may be made to these embodiments without departing from the broader spirit and scope of the various embodiments.

Figure 1:
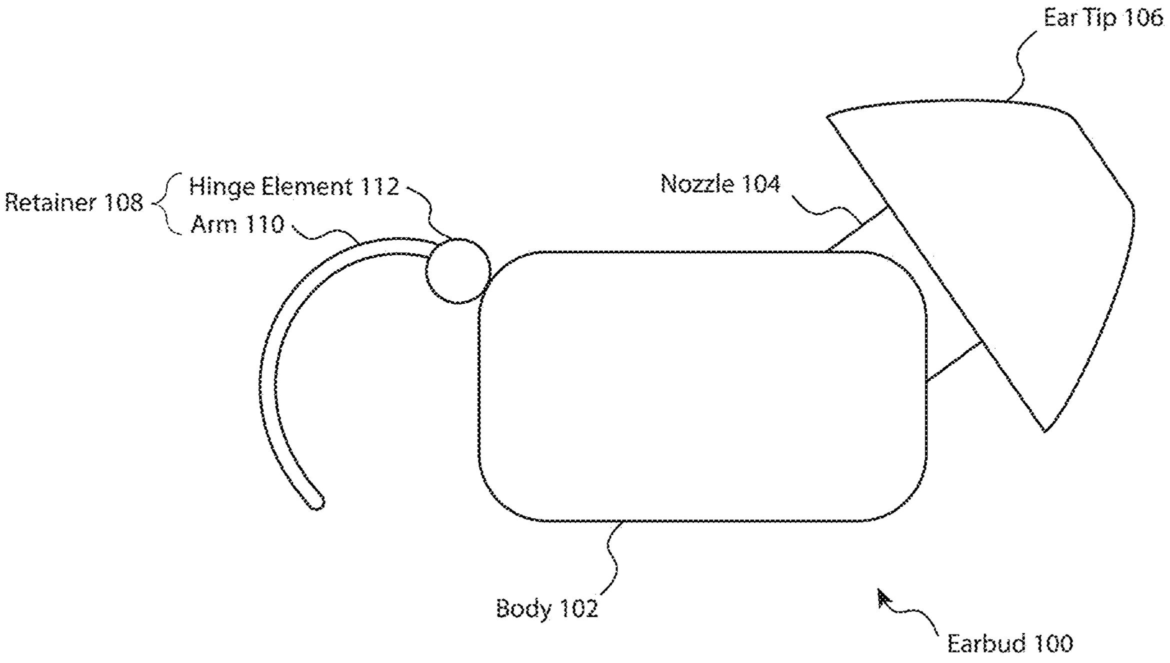
FIG. 1 illustrates an earbud including a retainer comprising an arm configured to contact a concha of the ear and comfortably and securely retain the earbud in the ear, according to one or more embodiments.

FIG. 1 illustrates an earbud 100 with a retainer 108 for securely and/or comfortably retaining the earbud 100 within an ear (e.g., the ear 10) of a user, according to one or more embodiments. The earbud 100 may include a body 102, a nozzle 104, an ear tip 106, and a retainer 108. The earbud 100, for example, may be a small headphone worn inside the ear 10. For example, the earbud 100 may be utilized for listening to audio, music, and other forms of audio entertainment. The earbud 100 may also be utilized for utilitarian purposes, for example to cancel noise, to generate masking noise, to block noise, to selectively pass sound from the environment of the user, to amplify sound from the environment of the user, to aid in rest and/or sleep, to aid in communication (e.g., collecting audio on a speaker for use on a call), to monitor physiological indicators (e.g., heart beats, respiration events, temperature, motion) and/or other purposes known in the art. Although a right-side instance of the earbud 100 is shown, it will be recognized that a left-side instance of the earbud 100 to fit a left instance of the ear 10 may be produced as a mirror-image of the right side instance of the earbud 100.

The body 102 may comprise a hard or soft shell protecting one or more electronics, for example wireless antennas, controllers, speakers, microphones, and/or other internal components of the earbud 100. The body 102, for example, may be made from a rigid or semi-rigid plastic. In one or more embodiments, the body 102 may comprise a combination of a boot (e.g., the boot 200) that may be a soft and/or flexible material fitting over a housing (e.g., the housing 302), for example as shown and described in conjunction with FIG. 10A through FIG. 10D, and FIG. 11A through FIG. 11C. The nozzle 104 may extend from the body 102 to either house a speaker and/or carry sound from a speaker within the body 102 to the end of the ear tip 106. The ear tip 106 may be coupled to the nozzle 104, and may be optionally replaceable or detachable for replacement, modular fitting, and/or cleaning. The ear tip 106 may audibly couple to, and optionally form a seal against, the auditory canal 12, for example as shown and described in conjunction with the embodiments of FIG. 4 and FIG. 5. In one or more embodiments, the ear tip 106 may be made of a soft rubber or other polymer material.

The earbud 100 may fit into the concha 20 of the ear 10, for example as shown and described in through the present embodiments. Although a friction interaction between the concha 20 and the body 102 and/or the ear tip 106 may provide some degree of retention security, the retainer 108 may improve retention security while maintaining and/or improving fit, function, and/or comfort of the earbud 100, and may synergistically improve comfort and/or security provided by the ear tip 106, as shown and described throughout the present embodiments.

In one or more embodiments, the retainer 108 comprises an arm 110 and a hinge element 112. The arm 110 may extend from an aft portion and/or an internally-facing portion of the earbud 100 (e.g., the aft portion 61 and/or the interior-facing portion 62 of FIG. 13) and, depending on a length, shape, and angle of protrusion from the earbud 100 may contact various parts of the ear 10 to establish secure retention of the earbud 100, for example the concha 20, the antihelix 22, and/or the antitragus 16 (e.g., as shown in FIG. 4 through FIG. 12). The hinge element 112 may be a distinct hinge element 112, for example a hinge shown in FIG. 1 (e.g., a torsion spring, a leaf spring), may include multiple hinging sub-elements, and/or may be integrated into the arm 110 (e.g., through utilizing of a flexible material having a spring-like restoring force, e.g., as shown in FIG. 6A through FIG. 9). In one or more embodiments, the retainer 108 provides a secure yet comfortable fit in which no portion of the retainer 108 may extend outside of a conchal cavity 25, such that pressure against the ear 10 of the user, and/or internal motion of the earbud 100 within the conchal cavity 25, minimizes uncomfortable pressure and/or contact on the ear 10.

Figure 2:
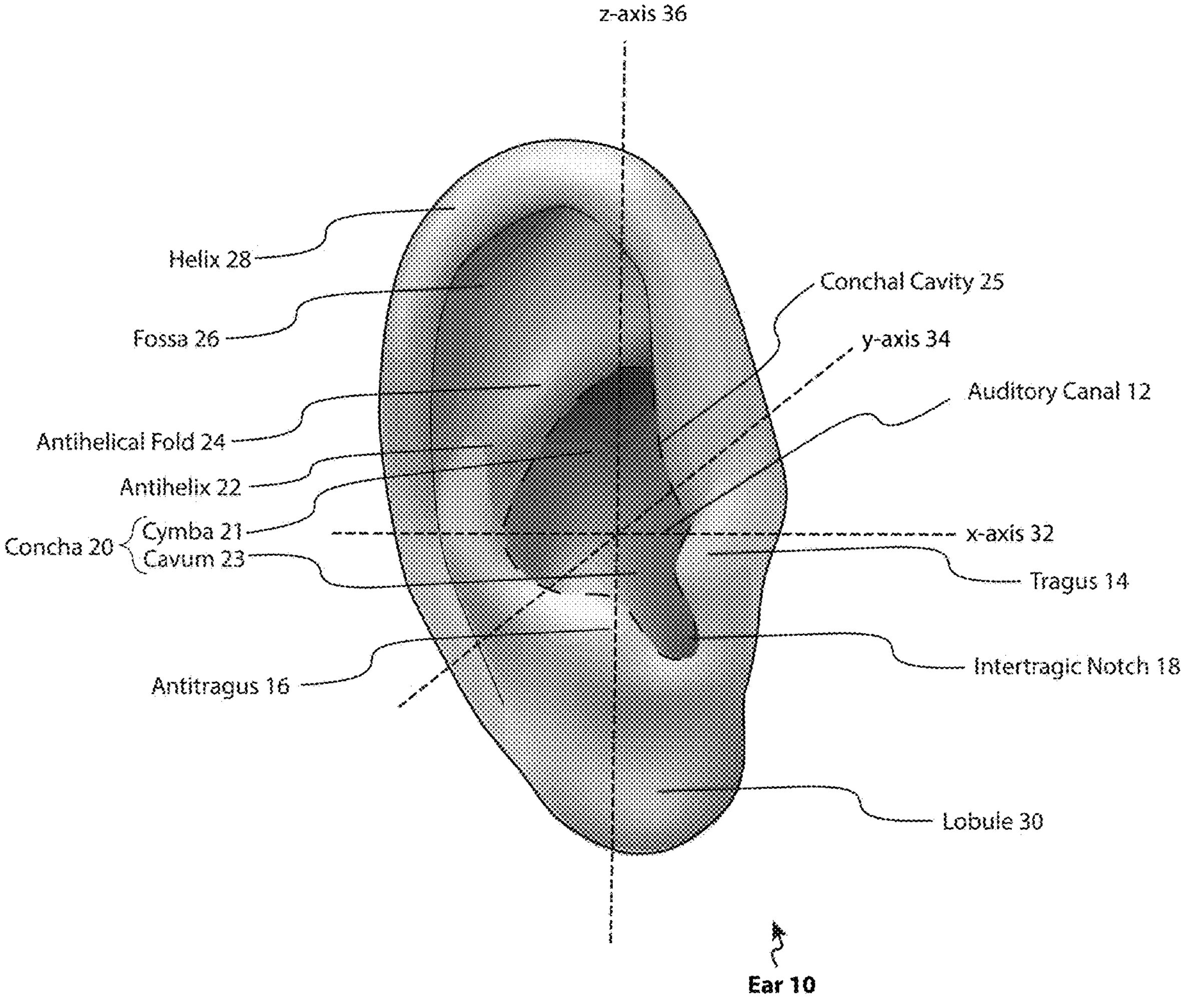
FIG. 2 illustrates an ear and anatomical elements thereof for reference purposes herein, including a set of axes of the ear, according to one or more embodiments.

FIG. 2 illustrates an ear 10, and specifically a right-hand instance of the ear 10 that may be referred to as an ear 10R, which may be useful for reference herein, according to one or more embodiments. The ear 10 includes several anatomical elements, including an auditory canal 12 (which may also be referred to as an ear canal), a tragus 14, an antitragus 16, an intertragic notch 18, a concha 20 (including a cymba 21, which also may be referred to as a cymba concha, and a cavum 23, also may be referred to as a cavum concha), an antihelix 22, an antihelical fold 24, a fossa 26, a helix 28, and a lobule 30. In the present embodiments, the entire inner depression counted by the tragus 14, the antitragus 16, the antihelix 22, and the front-facing portion of the helix 28 may be referred to as the "conchal cavity", and labeled the conchal cavity 25. Parts of the ear 10 will be referred to throughout the present embodiments. Unless specifically noted or evident from the context of usage, recitation of an element of the ear 10 may refer to either a left instance of the ear 10 (e.g., an ear 10L) or the right instance of the ear 10 (e.g., the ear 10R).

The ear 10 may include a set of axes of the ear 10, including an x-axis 32 of the ear 10, a y-axis 34 of the ear 10, and a z-axis 36 of the ear 10. The axes of the ear 10 may be utilized for reference herein. The axes of the ear 10 can be arbitrarily assigned, but in one or more embodiments are oriented for a user which is standing upright such that the z-axis 36 aligns with a direction of gravity, and both the x-axis 32 and the y-axis 34 run perpendicular to the z-axis 36 and each other. In one or more embodiments, this may result in an x-axis 32 that may extend through a first location formed by a notch formed by the transition from the antihelix 22 to the antitragus 16, and through a second location crossing the upper portion of the tragus 14. Similarly, the y-axis 34 may run perpendicular to the x-axis 32, extending inward toward the opposite ear of the user and approximately normal to a surface of the concha 20.

It will be recognized that each user, and each instance of the ear 10, may vary slightly in shape, including in extent, angle, and curvature of various anatomical elements. It will also be recognized that the ear 10 of FIG. 2, FIG. 3, FIG. 4, FIG. 5, FIG. 12, and each of the other embodiments, is merely representative examples. In one or more embodiments, an advantage of the retainer 108 is that the arm 110 may adjust to the curvature of different instances and curvatures and/or surface topologies of the conchal cavity 125.

Figure 3:
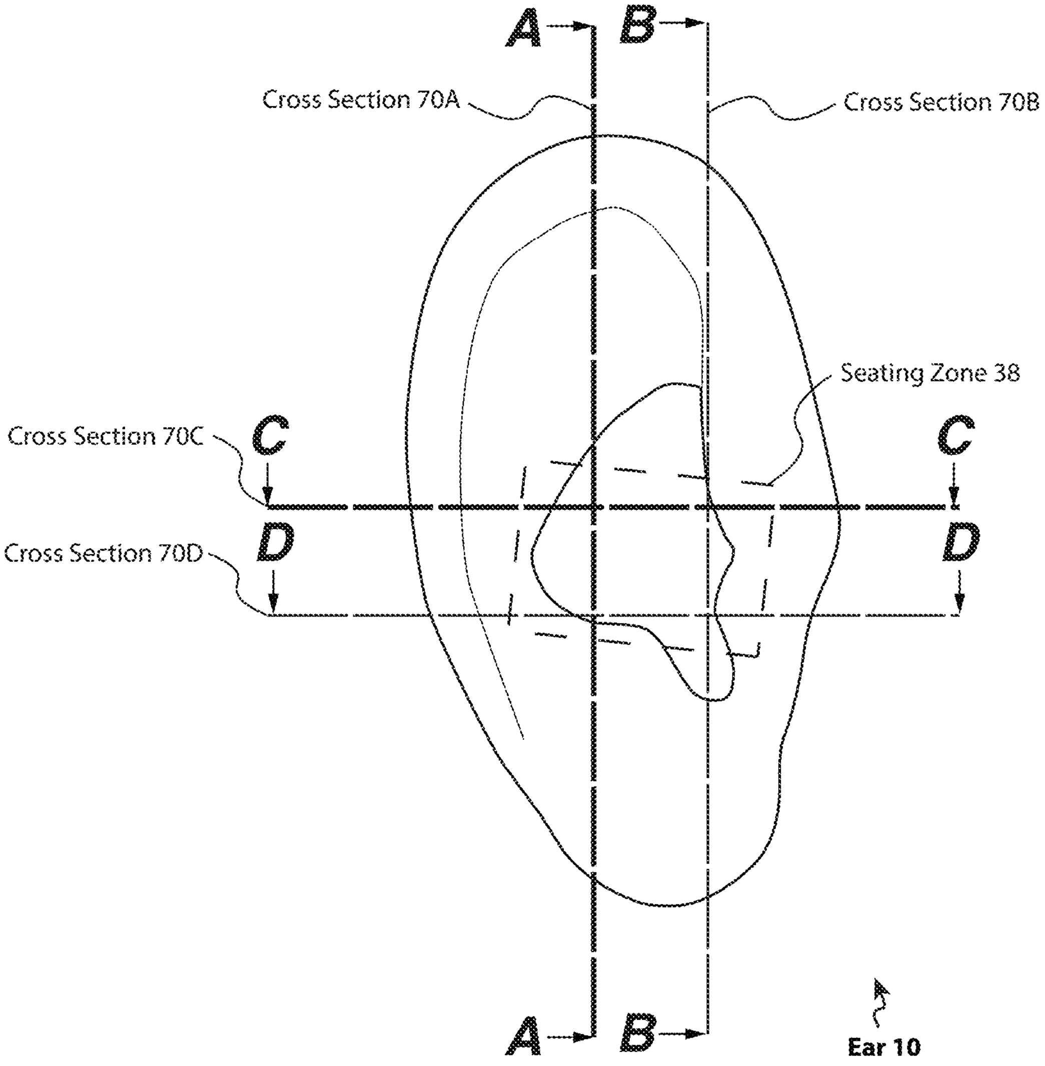
FIG. 3 illustrates the ear of FIG. 2 comprising a seating zone and a set of vertical cross sections and horizontal cross sections further utilized for illustration in the embodiments FIG. 4 and FIG. 5, respectively, according to one or more embodiments.
Figure 4:
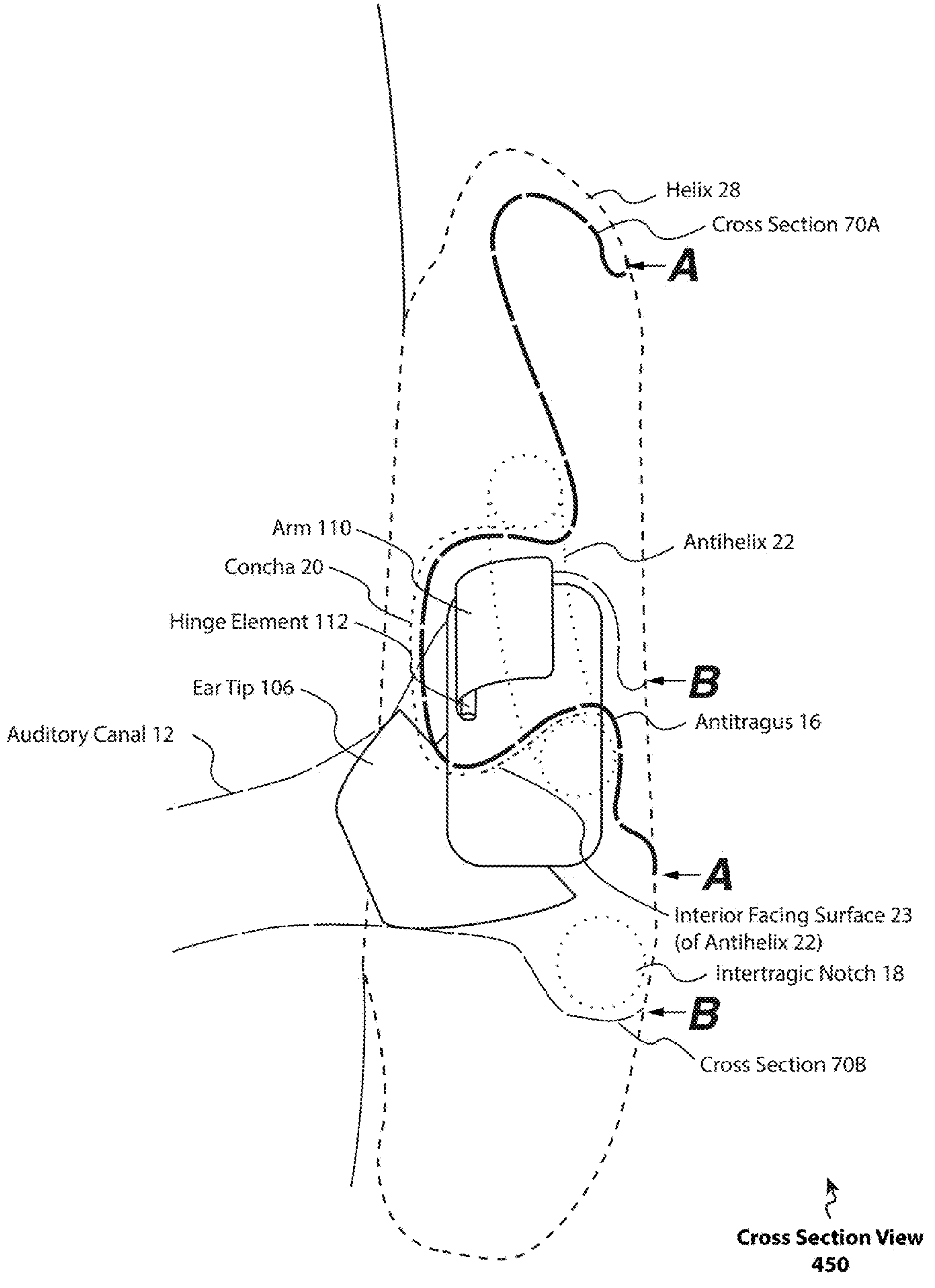
FIG. 4 illustrates a first cross section view of a vertical cross section of the ear with the earbud of FIG. 1 securely seated, according to one or more embodiments.
Figure 5:
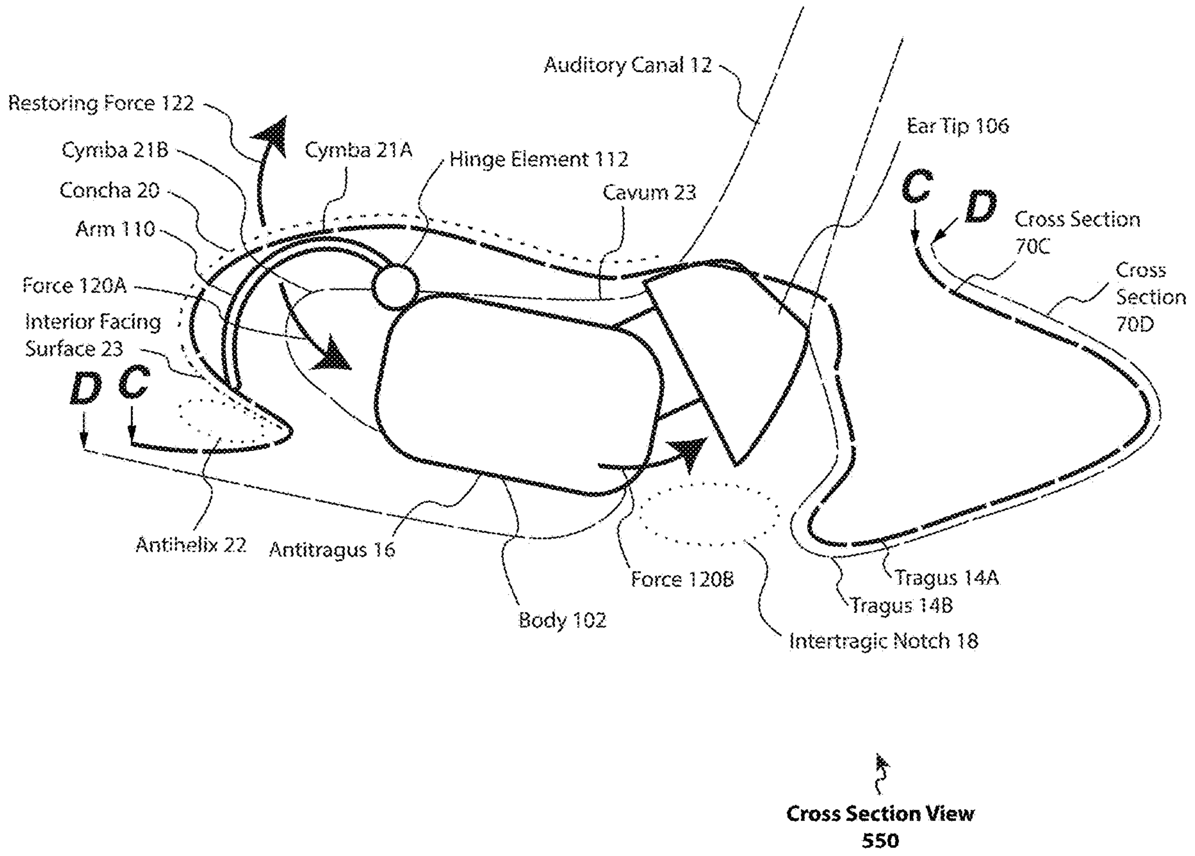
FIG. 5 illustrates a second cross section view of a horizontal cross section of the ear and earbud of FIG. 4, according to one or more embodiments.

FIG. 3 illustrates the ear of FIG. 2 comprising a seating zone 38 and a set of vertical cross sections (e.g., the cross section 70A and the cross section 70B) and horizontal cross sections (e.g., the cross section 70C and the cross section 70D) further utilized for explanation in the embodiments FIG. 4 and FIG. 5, respectively, according to one or more embodiments. The cross sections 70 of FIG. 3 may be utilized to demonstrate fit, seating, and/or depth, as further described herein. The seating zone 38 may be, according to one or more embodiments, an area of the conchal cavity 25 in which the earbud 100, including the ear tip 106 and the retainer 108, may be securely and comfortably seated.

FIG. 4 illustrates a cross sectional view 450 of the earbud 100 of FIG. 1 securely and comfortably seated in the ear of FIG. 3, according to one or more embodiments. The user may slip the earbud 100 into the conchal cavity 25, the ear tip 106 fitting and/or possibly forming an annular seal with the auditory canal 12. In one or more embodiments, the arm 110 may extend into, and contact, the concha 20. As the earbud 100 is installed by the user, the arm 110 may flex and/or the hinge element 112 may resistively hinge the arm 110, such that the arm 110 may remain in firm contact with the concha 20. One or more resulting forces occur, for example as shown and described in conjunction with FIG. 5. Once installed, the arm 110 may follow a curvature of the concha 20, for example to the interior facing surface 23 of the antihelix 22. In the embodiment of FIG. 4, the antihelix 22 is illustrated as a curved, tube-like structure outlined in dots that is shown extending out-of-plane from the cross section 70A (e.g., extending "out of the page" toward the viewer of the diagram). In one or more embodiments, the arm 110 does not leave the conchal cavity 25, preventing catching and/or other potentially uncomfortable contact and/or other contact potentially unseating the earbud 100 if the ear 10 of the user comes in contact with a surface such as a pillow or helmet.

Figure 13A:
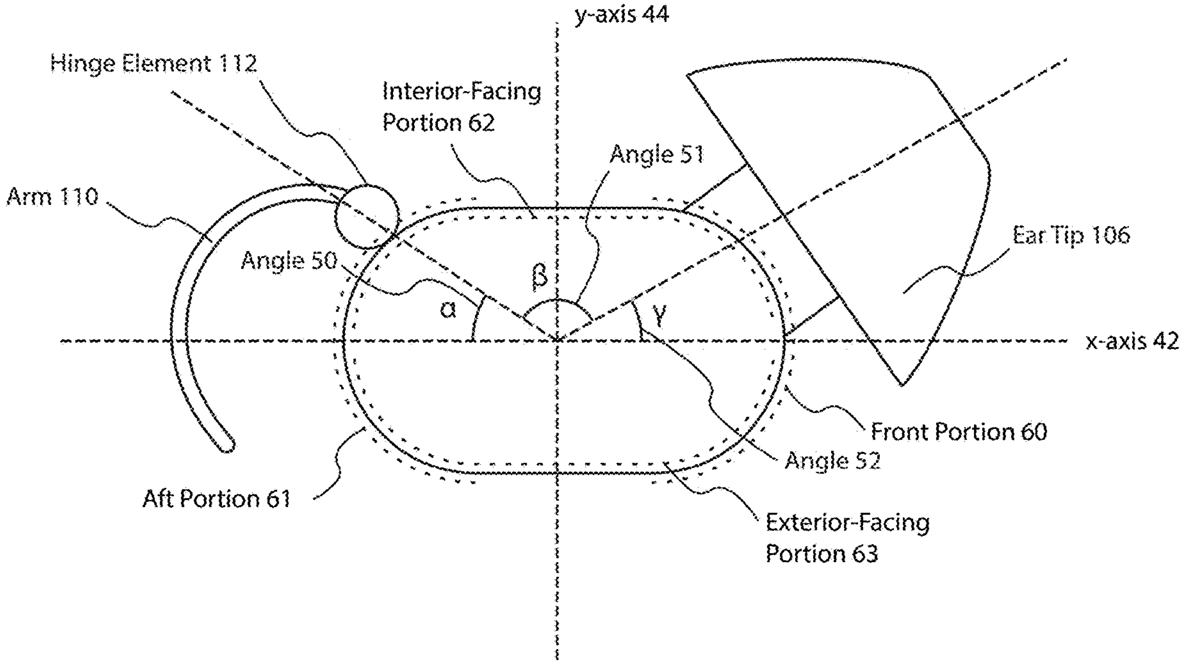
FIG. 13A illustrates an exterior facing view of the earbud of FIG. 1, including several axes of the earbud and portions thereof (e.g., the front portion, the aft portion) that may be utilized in discussion herein, according to one or more embodiments.
Figure 13B:
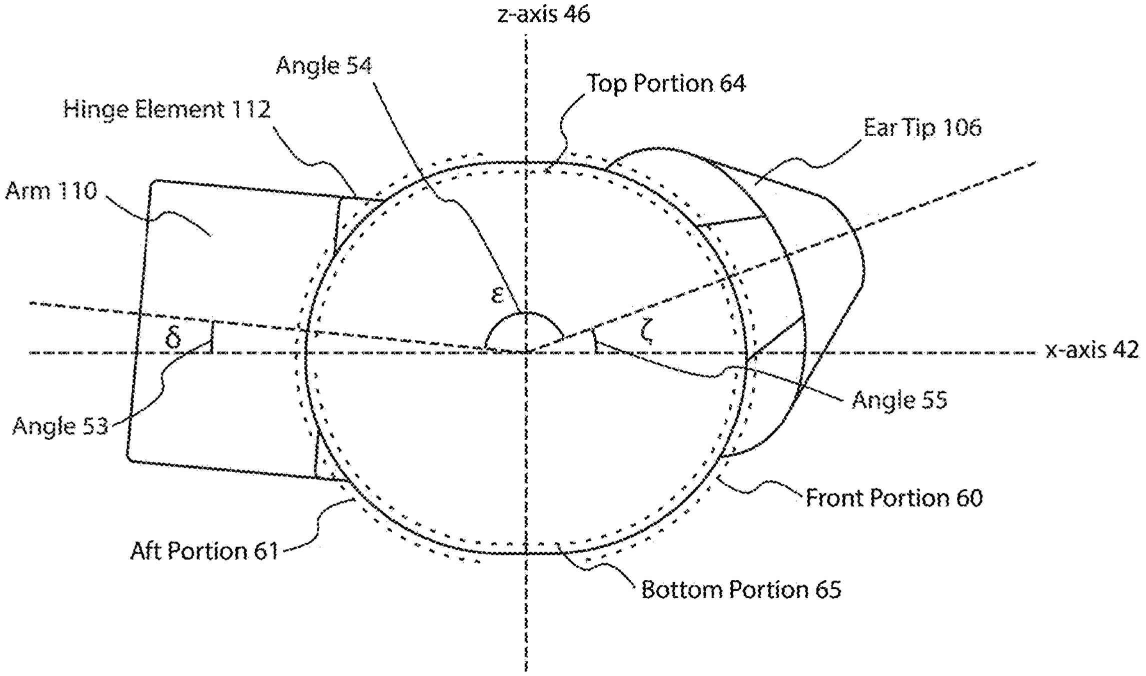
FIG. 13B illustrates a top view of the earbud of FIG. 1, including several axes of the earbud and portions thereof (e.g., the an interior-facing portion, an exterior-facing portion) that may be utilized in discussion herein, according to one or more embodiments.

It should be noted that the arm 110 may extend from the body 102 of the earbud 100 starting at various portion of the body 102 and/or at various angles, as further shown and described in conjunction with the embodiment of FIG. 13A and FIG. 13B. In the present example, the arm 110 is shown at an elevated angle (e.g., the angle 53 of FIG. 13B, denoted and referred to herein with a lower-case delta, '$\delta$', and which may be referred to as an upward angle), for example between and including 10 degrees to 20 degrees. The arm 110 is also shown with an internal angle (e.g., the angle 50 of FIG. 13A, denoted and referred to herein with a lower-case alpha, '$\alpha$', which may also be referred to as an inward angle), for example between and including 30 degrees to 50 degrees. In one or more other embodiments, a may be between 5 degrees and 60 degrees, e.g., the angle from an x-axis of the earbud toward a z-axis of the earbud.

However, other angles are possible, including a δ of zero degrees and an a of zero degrees. Where δ is positively angled, the contact between the arm 110 with the concha 20 may occur above and/or predominantly above the x-axis 32 as shown in FIG. 2 (e.g., within the concha 20 adjacent to the antihelix 22). In contrast, where δ is zero, the contact may occur between the arm 110 and the concha 20 may occur along the x-axis 32 of FIG. 2 (e.g., within the concha 20 adjacent to the cleft transitioning between the antihelix 22 to the antitragus 16).

The arm 110 or portion thereof may follow a vertical curvature of the concha 20 when projected into the an y-z plane of the ear 10, as shown and described in conjunction with the embodiment of FIG. 3. In FIG. 5, the cross section 70A while offset from the y-z plane as illustrated in FIG. 3, show similar curvature of the concha 20 along perpendicular planes before and after the y-z plane, and are therefore representative of the curvature therein.

FIG. 5 illustrates a second cross section view that is a horizontal cross section 550 of the ear 10 and earbud 100 of FIG. 4, according to one or more embodiments. In the present embodiment, certain elements of the ear 10 are labeled as an "upper" and a "lower" portion when such anatomical element spans both the cross section 70C and the cross section 70D. As one example, the tragus 14 spans the portion of the ear 10 sectionalized by the cross section 70C and the cross section 70D, and is therefore labeled the tragus 14A and the tragus 14B to refer to the upper portion of the tragus 14 and the lower portion of the tragus 14, respectively.

In one or more embodiments and the embodiment of FIG. 5, the arm 110 is illustrated as contacting the concha 20 (and specifically, the upper portion of the cymba 21 along the cross section 70, shown as the cymba 21A), and then follows the curvature of the concha 20 counter-clockwise from a top-view perspective, in the case of the right instance of the ear 10. In one or more embodiments, the arm 110 may follow the curvature of the concha 20 to the interior facing surface 23 of the antihelix 22. It will be understood that the interior facing surface 23 of the antihelix 22 is still within the conchal cavity 25, although for reference purposes is shown and described as the skin on the other side of the exterior-facing antihelix 22. In the present embodiments, the concha 20 transitions to the interior facing surface 23 of the antihelix 22 at an inflection point in the conchal cavity 25, as shown between the dashed line illustrating the concha 20 from the dot-dashed line illustrating the interior facing surface 23 of the antihelix 22.

In one or more embodiments and the embodiment of FIG. 5, the arm 110 may deflect when a force 120A is applied, for example generated when the user pushes the earbud 100 into the conchal cavity 25. The arm 110, or a portion of the arm, may push off and/or hinge away from the wall of the conchal cavity 25, for example the concha 20 and/or the interior facing surface 23 with the restoring force 122. The restoring force 122 may effect the force 122B, which may be a linear and/or rotational force applied to the body 102 such that the body 102 is driven toward the front of the ear (e.g., toward the tragus 14) and/or toward the ear tip 106. The force 122B may help maintain a tight annular seal between the ear tip 106 and the auditory canal 12, and/or may increase retention security of the earbud 100 through application of diametrical force a ross the seating zone 38 of the ear 10, according to one or more embodiments. In one or more embodiments, and as shown and described in conjunction with them embodiment of FIG. 9 through FIG. 12, the arm 110 may be made and/or may be surface-coated with a material having a high coefficient of friction with human skin, and specifically may have a high coefficient of friction with soft and/or relatively smooth ear skin. In one or more embodiments, the arm 110 may therefore continue applying the force 122B while remaining positioned within the conchal cavity 25.

The arm 110 or portion thereof may follow a horizontal curvature of the concha 20 when projected into the an x-y plane of the ear 10, as shown and described in conjunction with the embodiment of FIG. 3. In FIG. 5, the cross section 70C and the cross section 70D, while above and below the x-y plane as illustrated in FIG. 3, show similar curvature of the concha 20 along perpendicular planes above and below the x-y plane, and are therefore representative of the curvature therein. Where both the horizontal and vertical curvature of the concha 20 is followed, the retainer 108 and/or the arm 110 may comprise a "spoon like" portion closely following the horizontal and vertical contours of the conchal cavity 25.

FIG. 6A through FIG. 8B illustrate various motions of the earbud 100 within the conchal cavity 25 of the ear 10 that may occur depending on application of force to the earbud 100 and/or the ear 10. In one or more embodiments, the earbud 100 is secured such that it may be initially held in a neutral position within the conchal cavity 25, and may then restoratively displace in response to a force applied to the ear 10 and/or anatomical element thereof. In one or more embodiments, the retainer 108 may include an arm 110 capable for flexing in up to six directions (e.g., having three spatial degrees of freedom). In one or more embodiments, the ear tip 106 may be soft and made of a flexible polymer, which may also have a spring constant and/or restoring force tending to reestablish the neutral position once force on the ear 10 decreased and/or abates.

Figure 6A:
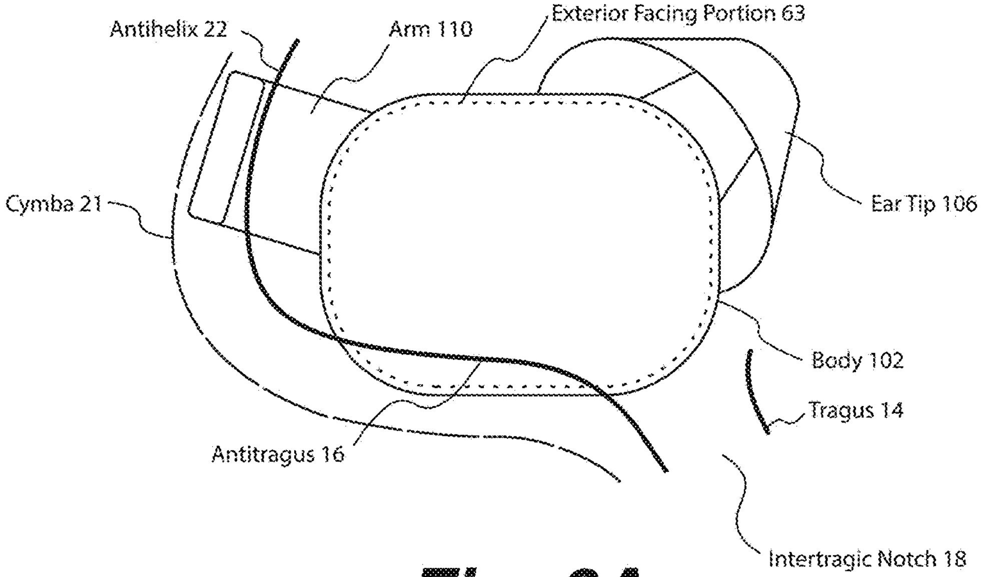
FIG. 6A illustrates a side view of the earbud of FIG. 1 seated in the ear in a neutral position, including for further reference in conjunction with FIG. 7A and FIG. 7B, according to one or more embodiments.
Figure 7A:
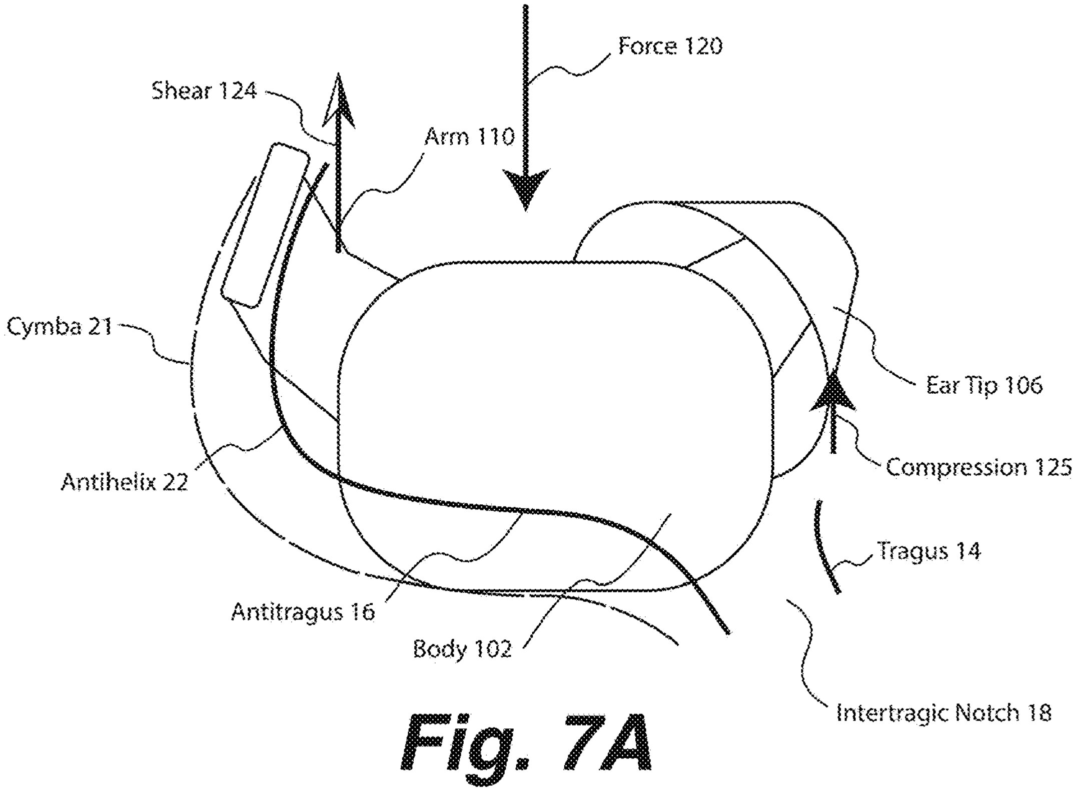
FIG. 7A illustrates application of a downward force on the earbud resulting in a translation of the earbud from the neutral position and an upward shear of the arm of the retainer, according to one or more embodiments.
Figure 7B:
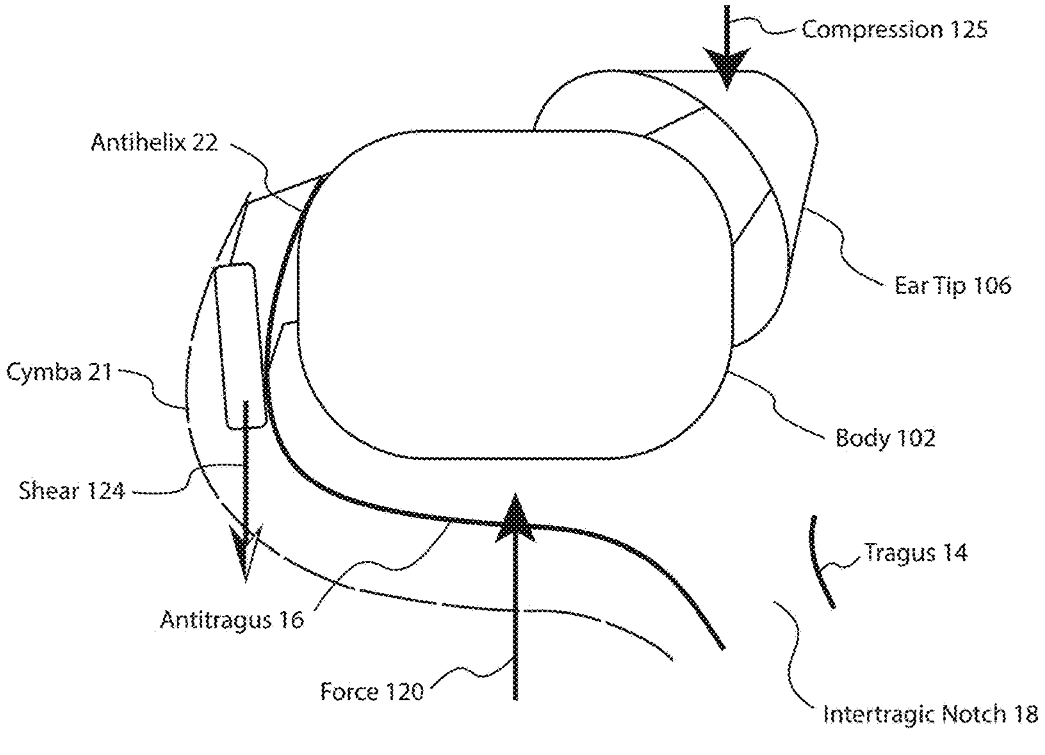
FIG. 7B illustrates application of an upward force on the earbud resulting in a translation of the earbud from the neutral position and a downward shear of the arm of the retainer, according to one or more embodiments.

FIG. 6A illustrates a side view of the earbud of FIG. 1 seated in the ear 10 in a neutral position for further reference in FIG. 7A and FIG. 7B, according to one or more embodiments. The user may install the body 102 in the conchal cavity 25, where the body 102 is embraced on the interior-facing portion 62 of the body 102 by the concha 20 (on the obscured side in the present embodiment) and embraced on the exterior facing portion 63 of the body 102 by the interior facing portion of the antitragus 16. When installed, there may remain a small gap under the bottom portion 65 of the earbud 10. Similarly, a gap may be maintained between the top portion 64 and the top portion of the conchal cavity 25 (this top of the conchal cavity 25 and/or the upper portion of the antihelix 22 is not shown in the present embodiment). The arm 110 is shown at an elevated angle, where δ approximately equals 20 degrees, plus or minus 5 degrees. In one or more embodiments, δ may be between 5 degrees and 60 degrees, e.g., the angle from the x-axis of the earbud toward a y-axis of the earbud.

Figure 6B:
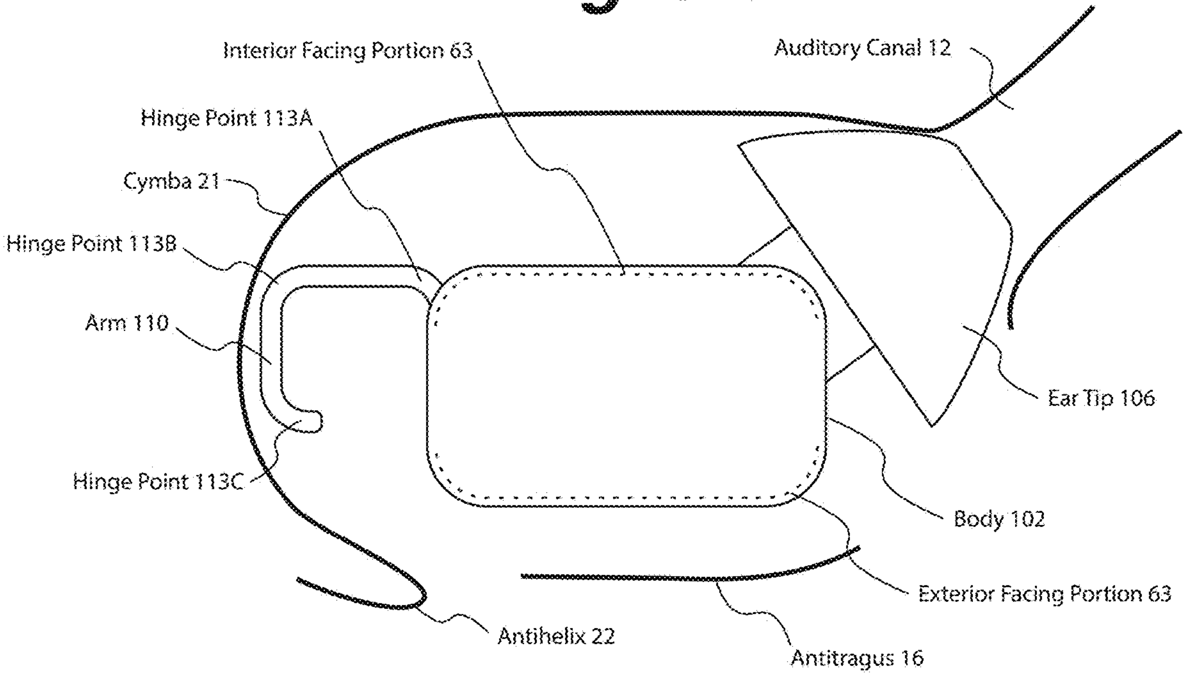
FIG. 6B illustrates a top view of the earbud of FIG. 1 seated in the ear in a neutral position, including for further reference conjunction with FIG. 8A and FIG. 8B, according to one or more embodiments.

In one or more embodiments and the embodiment of FIG. 6A and FIG. 6B, the arm 110 may be made from a single flexible polymer material, optionally with one or more introduced hinge points 113, for example as shown and described in conjunction with FIG. 6B. The arm 110 may extend into and contact the concha 20 at the cymba 21, and may optionally follow all or some portion of the curvature of the concha 20 such as the cymba 21 toward the antihelix 22, as also further shown and described in conjunction with FIG. 6B.

Figure 8A:
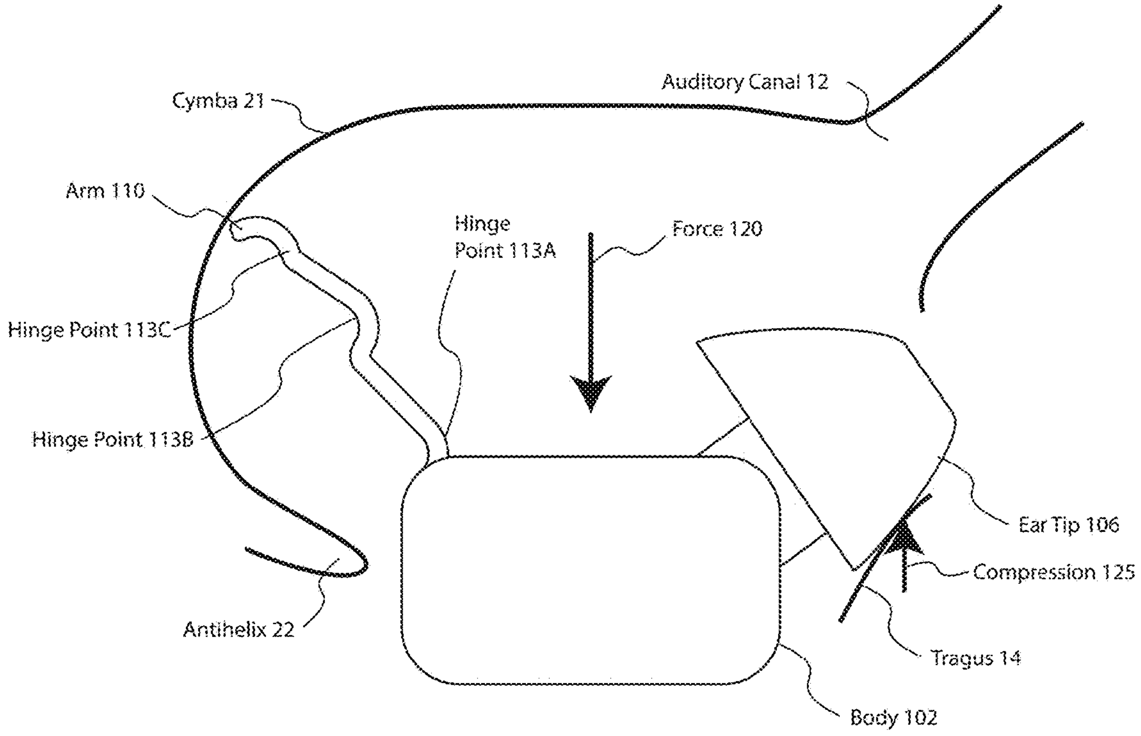
FIG. 8A illustrates application of an outward force on the earbud resulting in a translation of the earbud from the neutral position and hinging of the arm of the retainer, according to one or more embodiments.
Figure 8B:
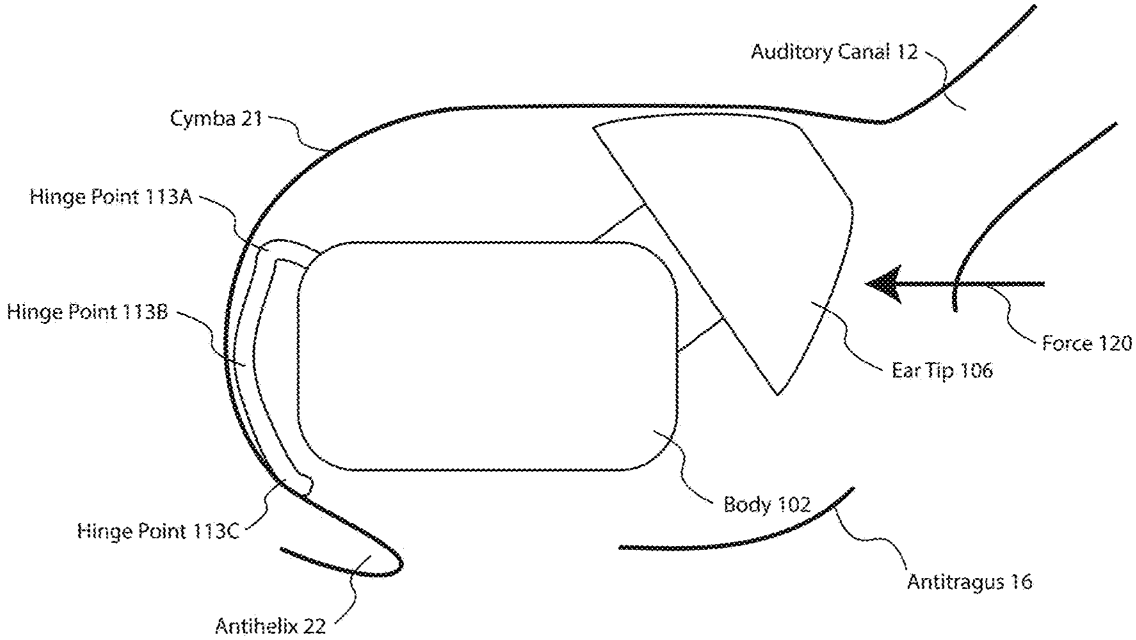
FIG. 8B illustrates application of a backward force on the earbud resulting in a translation of the earbud from the neutral position and a compression and/or crushing of the arm of the retainer, according to one or more embodiments.

FIG. 6B illustrates a top view of the earbud of FIG. 1 seated in the ear 10 in a neutral position for further reference in FIG. 8A and FIG. 8B, according to one or more embodiments. An example shape of the arm 110 is illustrated, for example an "L" shape connected to the back-right-top portion of the earbud 100 (e.g., an area on the body 102 where the aft portion 61, the interior-facing portion 62, and the top portion 64 may overlap). The arm 110 may include one or more hinge points 113, for example the hinge point 113A, the hinge point 113B, and the hinge point 113C that may be established at each ninety-degree bend in the arm 110 when the arm 110 is in a restored position. Although one example of the retainer 108 is illustrated in FIG. 6A and FIG. 6B, it will be appreciated that other shapes, profiles, and hinge elements 112 of the retainer 108 may be utilized, including retainers 108 following more or less along the curvature of the concha 20, interior facing surface 23 of the antihelix 22, and/or even the interior-facing surface of the antitragus 16. In addition, hinge points 113 may occur along strait surfaces and/or strait portions of the arm 110.

In one or more embodiment, the arm 110 may establish a gap between the aft portion 61 one of the earbud 100 and the concha 20, and/or a gap between the interior facing surface 23 of the antihelix 22. In one or more embodiments, the arm 110 and/or a gap between the ear tip 106 may establish a gap between the interior facing portion 62 and the concha 20. The ear tip 106 may additionally establish a gap between the front portion 60 and the front of the conchal cavity 25 and/or the interior-facing surface of the tragus 14.

In one or more embodiments, and as shown in FIG. 6A and FIG. 6B, contact between the body 102 and the skin of the user may be reduced and/or minimized optional use of the rubber-like materials of the arm 110 and the ear tip 106 holding the earbud 10 in a neutral position within the conchal cavity 25. This may further increase conform by, for example, suspending the earbud 100 with minimal contact between the body 102 and the skin of the ear 10.

Maintaining a neutral position that encourages gaps on one or more sides of the body 102 may also increase comfort by allowing ventilation and/or evaporation of perspiration in and around the conchal cavity 25. Similarly, one or more holes in the retainer 108 (e.g., the hole 116 of FIG. 9) may also help assist with comfort through improved ventilation and/or evaporation of perspiration.

FIG. 7A illustrates application of a downward force (e.g., the force 120) on the earbud 100 resulting in a translation of the earbud 100 from the neutral position (e.g., as shown in FIG. 6A) and an upward shear of the arm 110 of the retainer 108 (e.g., the shear 124), according to one or more embodiments. The force 120 of FIG. 7A may occur, for example, as the user moves against a resting surface such as a pillow and/or places headwear over their head, either of which may apply downward force or pressure to the ear 10. The force 120 of FIG. 7A may also result from the user interacting with the earbud 100, for example attempting to manipulate a touch interface of the earbud 100 (e.g., the interface 305 of FIG. 11C, the interface 405 of FIG. 12). As the force 120 of FIG. 7A is applied, the earbud 100 may be pushed toward, and possibly displace ad/or consume, any remaining gap under the bottom portion 65, for example coming to rest on a transition between the concha and the interior facing surface of the antitragus 16. Where the arm 110 is in contact with the concha 20 and/or the interior facing portion 23 of the antihelix 22, the arm 110 may undergo the shear 124. The bottom of the ear tip 106, too, may undergo a compression 125. As the force 120 of FIG. 7A is reduced or released, the shear 124 may reverse through a restoring force action of the arm 110, and similarly the compression 125 may reverse through a restoring force tending to reestablish the shape of the ear tip 106. During application of the force 120 of FIG. 7A, no sharp, pointed, or hard-edged portions of the arm 110 and/or the ear tip 106 may come in contact with the ear 10. At the same time, the force 120B illustrated in FIG. 5 may be maintained, tending to keep the ear tip 106 in contact with, pushed towards, and/or annularly sealed against the auditory canal 12. Therefore, in one or more embodiments, the earbud 100 secured by the retainer 108 may remain comfortable while also secure and functional.

Although the force 120 of FIG. 7A is illustrated as a downward force on the body 102, it will be recognized that an upward force applied against the retainer 108 (e.g., originating below the ear) would result in movement of the aft wall of the conchal cavity upward, similarly causing the arm 110 to shear.

FIG. 7B illustrates application of an upward force (e.g., the force 120 of FIG. 7B) on the earbud 100 resulting in a translation of the earbud 100 from the neutral position and a downward shear (e.g., the shear 124 of FIG. 7B) of the arm of the retainer 108, according to one or more embodiments. The force 120 of FIG. 7B may occur, for example, as the user moves against a resting surface such as a pillow and/or removes a helmet from their head, which may apply upward force or pressure to the ear 10 in the process. The force 120 of FIG. 7B may also result from the user interacting with the earbud 100, for example attempting to manipulate a touch interface of the earbud 100 (e.g., the interface 305 of FIG. 11C, the interface 405 of FIG. 12). The upward force 120 of FIG. 7B may results in an opposite response compared with that of FIG. 7A, e.g., a downward shear 124 and a compression 125 on a top of the ear tip 106. Following abatement of the force 120 of FIG. 7B, the restoring force of the arm 110 and the ear tip 106 may return the earbud 100 to the neutral position while maintaining comfort, seating security, and/or functionality.

Although the force 120 of FIG. 7B is illustrated as an upward force on the body 102, it will be recognized that a downward force applied against the retainer 108 (e.g., originating below the ear) would result in movement of the aft wall of the conchal cavity upward, similarly causing the arm 110 to shear.

Figure 12:
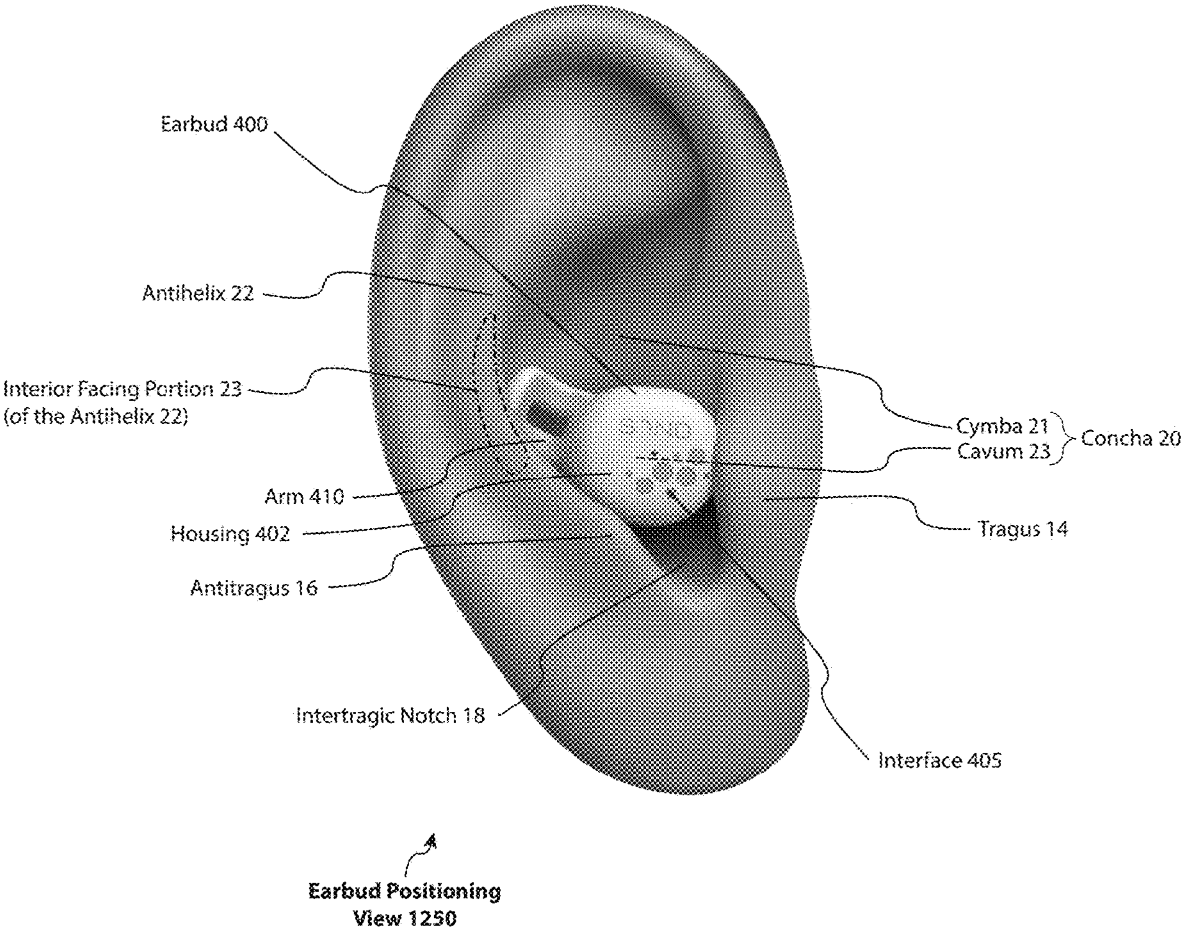
FIG. 12 illustrates a single-piece earbud including an industrially designed instance of the retainer of FIG. 1 securely and comfortably seated in the ear, according to one or more embodiments.

FIG. 8A illustrates application of an outward force 120 on the earbud 100, resulting in a translation of the earbud 100 from the neutral position. The outward force 120 may result, for example, if the head of the user accelerates or decelerates rapidly, and/or if an exterior facing portion of the earbud 100 catches on a pieces of cloth, bedding, headwear, and/or item of apparel. Depending on the material or materials used to construct the arm 110, the arm 110 may optionally hinge open, according to one or more embodiments. In one or more embodiments, therefore, the hinge element 112 may be a two-way hinge with a central restoring position. For example, as shown in FIG. 8A, the arm 110 may hinge "open" at the hinge point 113A, the hinge point 113B, and/or the hinge point 113C. The terminal portion of the arm 110 may "catch" within the concha 20 and/or the interior-facing portion 23 of the antihelix 22 to assist in retaining the earbud 100 within the conchal cavity 25. The tragus 14 may also compress the ear tip 106 (e.g., resulting in the compression 125) to assist in securely seating the earbud 100. It should be noted that the force 120 may also be deliberately applied to remove the earbud 100, and that the flex of the arm 110 and the compression 125 may be easily overcome with intension. An example of the earbud 100 neutrally seated prior to application of the outward force 120 is illustrated in FIG. 12. For example, in the embodiment of FIG. 12, both of the following may occur in response to the outward force 120: (i) the tragus 114 would apply a compression 125 against the ear tip 106 (hidden behind the tragus 114 in FIG. 12), and (ii) the arm 410 would apply friction against the concha 20, catch against interior-facing surface 23 of the antihelix 22, and/or catch against the antihelix 22. It should be noted that, especially where the arm 110 is made from a soft and/or flexible material, that the arm 110 "catching" on an anatomical element of the ear 11 is not necessary uncomfortable and/or may be diminished through spread-out pressure acting along the contact surface of the conchal cavity 25, yet may provide substantial retention capability.

FIG. 8B illustrates application of a backward force 120 on the earbud 100 resulting in a translation of the earbud 100 from the neutral position and a compression and/or crushing of the arm 110 of the retainer 108, according to one or more embodiments. The force 120 of FIG. 8B may result, for example, as the user moves against a resting surface such as a pillow and/or places a helmet over their head, applying backward force or pressure to the ear 10. The force 120 of FIG. 8B may also result from the user interacting with the earbud 100, for example attempting to manipulate a touch interface of the earbud 100 (e.g., the interface 305 of FIG. 11C, the interface 405 of FIG. 12).

In one or more embodiments, and the embodiment of FIG. 8B, the arm 110 may curl or flex inward (e.g., toward a concave curvature of the arm 110) in response to the backward instance of the force 120 of FIG. 8B. In one or more embodiments, the arm 110 may additionally, or alternatively, flatten and/or crush against the aft portion 61 of the earbud 100. For example, in the present embodiment of FIG. 8B, the arm 110 may flatten by hinging along the hinge point 113A, the hinge point 113B, and/or the hinge point 113C. Alternatively, where the arm 110 may be relatively rigid and the hinge element 112 may comprise one or more torsion springs, for example as could be utilized in the hinge element 112 of FIG. 5, the arm 110 may hinge along the hinge point 112 until folded against the aft portion 61 of the body 102. Following abatement of the force 120 of FIG. 8B, the process may reverse and a restoring force of the hinge element 112 (e.g., similar to the restoring force 122 of FIG. 5) may return the earbud 100 to the neutral position. Where the arm 110 can collapse, flatten, and/or crush, it may further increase comfort by reducing pressure on the concha 20 and/or the interior facing portion 23 of the antihelix 22, therefore increasing comfort, according to one or more embodiments. Although the force 120 of FIG. 8B is illustrated as a backward force against the body 102, it will be recognized that forward force against the retainer 108 (e.g., originating at the back of the ear) would result in movement of the aft wall of the conchal cavity forward, similarly causing the arm 110 to fold or crush.

In FIG. 7A through FIG. 8B, four directions of force have been illustrated: the downward force in FIG. 7A, the upward force in FIG. 7B, the outward force in FIG. 8A, and backward force in FIG. 8B. Although not shown, two additional force vectors, an inward force 102 (e.g., opposite FIG. 8A) and a forward force 120 (e.g., opposite FIG. 8B), also may be accounted for by one or more of the present embodiments, e.g., through a counterbalancing restoring force of the retainer 108 and/or the ear tip 106. Where the earbud 100 is subject to force from behind that pushes the earbud 100 forward, the ear tip 106 may be primarily utilized to provide the restoring force and return the earbud 100 to the neutral position. In one or more embodiments, when the earbud 100 is subject to an inward-facing instance of the force 120 that pushes the earbud 100 inward, the arm 110 may further resist the inward-facing instance of the force 120 through further hinging of the hinge element 112 (e.g., as shown in FIG. 5), and/or may further resist the inward-facing instance of the force 120 through a compression of the inward-facing portion of the ear tip 106. As a result, in one or more embodiments, the earbud 100 may be comfortably and securely maintained in a neutral, functional position through one or more (and up to six) potential restoring forces, e.g., positive and/or negative movement along three spatial axes.

It will additionally be obvious to one skilled in the art that although restorative capability along axes has been demonstrated, force vectors, and resulting restoring forces reestablishing the neutral position, may be a combination of forces and resulting restoring forces, e.g., a simultaneous application of the backward force 120 of FIG. 8B and the downward force 120 of FIG. 7A.

Figure 9:
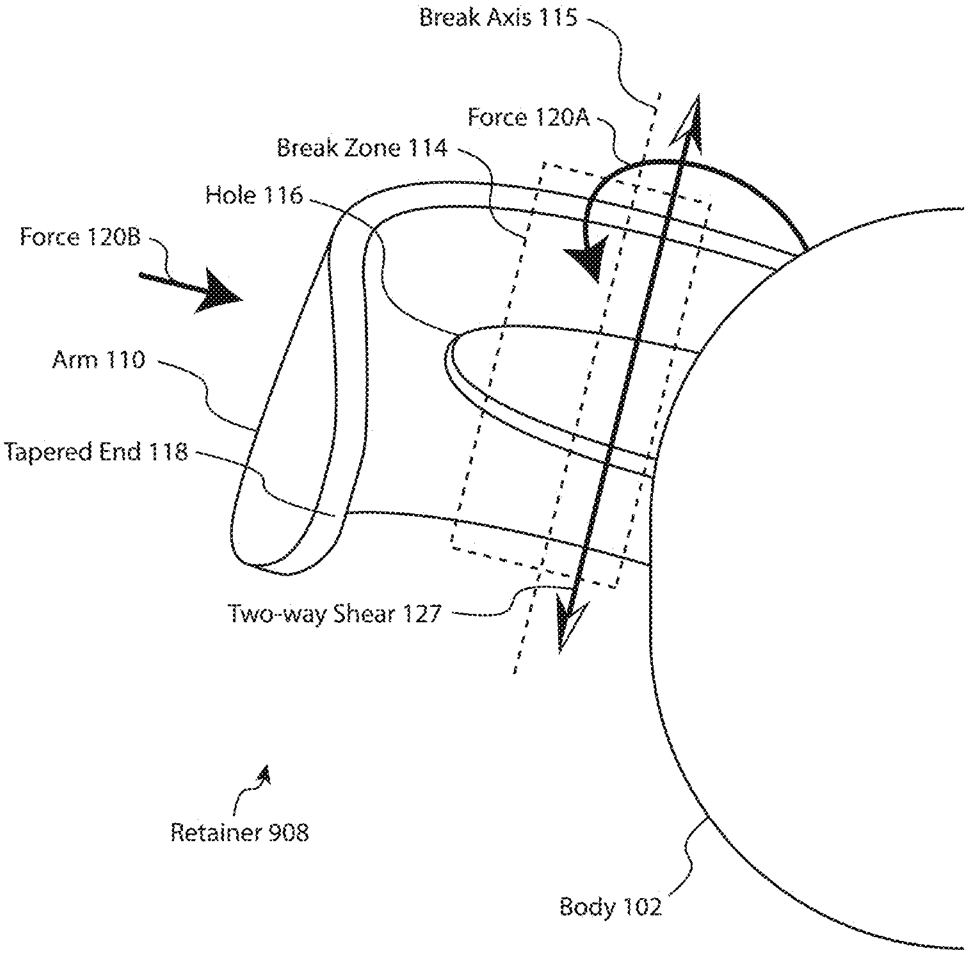
FIG. 9 illustrates an example of the retainer comprising a flexible material, a tapered end at a terminal portion of the arm, and a break zone and/or a break axis encouraging bending at the break zone and/or along the break axis, according to one or more embodiments.

FIG. 9 illustrates a retainer 908 which may be a further instantiated instance of the retainer 108, according to one or more embodiments. The retainer 908 is shown extending from the back-right-top portion of the right-side earbud 100R (e.g., an area on the body 102 of the earbud 100R where the aft portion 61, the interior-facing portion 62, and the top portion 64 may overlap). The retainer 908 may be made from a soft plastic, rubber, and/or other polymer material, for example molded and/or injection modeled as a single piece. Optionally, the retainer 908 may be molded as a single piece extending from the body 102 of the earbud 100 and/or the boot 200, as further shown and describe in conjunction with the embodiment of FIG. 10A through FIG. 10D. Alternatively, or in addition, the retainer 908 may be constructed by applying a coating to a rigid or semi-rigid substrate (e.g., a hard plastic or other polymer, sheet metal, one or more wires, titanium alloy, and/or a specialized metal with a strong restoring force, such as beryllium-copper). For example, in one or more embodiments, all or a portion of the arm 110 may be implemented as a leaf spring that may be coated with a soft material and/or polymer.

In one or more embodiments, and the embodiment of FIG. 9, the arm 110 may include a break zone 114 and/or a break axis 115 that may allow for increased ease of flexure within the break zone 114 and/or along the break axis 115. The break zone 114 and/or the break axis 115 may be implemented by changing the materials within the break zone 114 and/or the break axis 115 (e.g., a material subject to greater relative flexure than the rest of the arm 110), and/or by reducing the material relative to the rest of the arm 110. In one or more embodiment, the reduction of material may be accomplished through one or more holes, for example the hole 116, which may lower the hinging resistance of the material at the break zone 114 and/or along the break axis 115. The break axis 115 and/or the break zone 114 may be utilized to implement the hinge element 112 and/or the hinge point 113, according to one or more embodiments. In one or more embodiments, the break zone 114 and/or the break axis 115 may be utilized to encourage an upward shear 124 and/or a downward instance of the shear 124, as illustrated in conjunction with the embodiment of FIG. 7A and FIG. 7B, respectively. In the present embodiment, the upward instance of the shear 124 and the downward instance of the shear 124 is illustrated as the two-way shear 127.

In one or more embodiments, the retainer 908 may include a tapered ender 118 that may assist in reducing catching and/or uncomfortable contact with the conchal cavity 25, including during intentional unseating and/or uninstallation of the earbud 100 by the user.

Where the arm 110 is constructed from a relatively hard substrate made of plastic, metal, or another material, the shear 124 and/or the two-way shear 127 may be reduced. Alternatively, or in addition, rather than shear, the arm 110 may rotationally flex with increased ease around the break zone 114. For example, in one or more embodiments, the hole 116 and two connection points of the arm 110 may encourage a twist response, and provide a counter-twist restoring force, that can assist in keeping the earbud from rotating within the conchal cavity 25 (e.g., rolling along a roll axis, e.g., around the x-axis as a fourth degree of freedom).

Figure 10A:
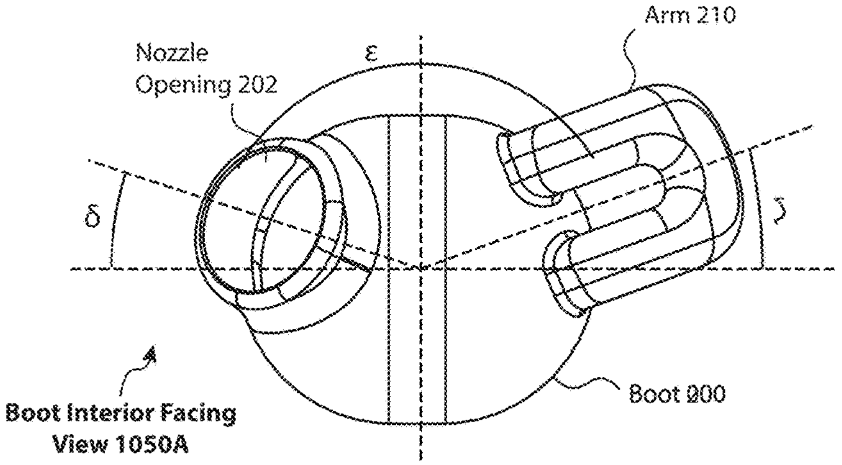
FIG. 10A illustrates an interior facing view of a boot comprising an industrially designed instance of the retainer of FIG. 1, according to one or more embodiments.

FIG. 10A illustrates a boot interior facing view 1050A of a boot 200 comprising an industrially designed instance of the retainer 108 of FIG. 1, according to one or more embodiments. In one or more embodiments, the earbud 100 may include one or more components, including for example a central housing that may be surrounded by a permanently attached or removably attached instance of the boot 200. The boot 200 may be made from a soft plastic, rubber, and/or other polymer material. The boot 200 may include one or more openings for insertion and/or installation of the housing of the earbud 100, for example the nozzle opening 202 through which the nozzle 104 may extend, and/or an exterior facing opening 202 through which the charging ports, touch sensors, microphones, and/or other functional and/or control interface components of the earbud 100 may be accessed without removing the boot 200. FIG. 10A also illustrates the angle 53, the angle 54, and the angle 55 (denoted δ, ε, and ζ, respectively), as further shown and described in conjunction with the embodiment of FIG. 13B. The angle 55 may be defined from a central point through the center of the nozzle opening 202 when viewed from the boot interior facing view 1050A. The angle 53 may be defined from the central point through the center of the arm 210 when viewed from the interior facing view 1050A.

It should be noted that while FIG. 10A and FIG. 13B both illustrate a right-side instance of the boot 200 and a right side instance of the earbud 100, respectively. FIG. 10A and FIG. 13B view the boot 200 and the earbud 100 from opposite sides. Thus, δ is shown on the right side of FIG. 10A, and the left side of FIG. 10B.

Figure 10B:
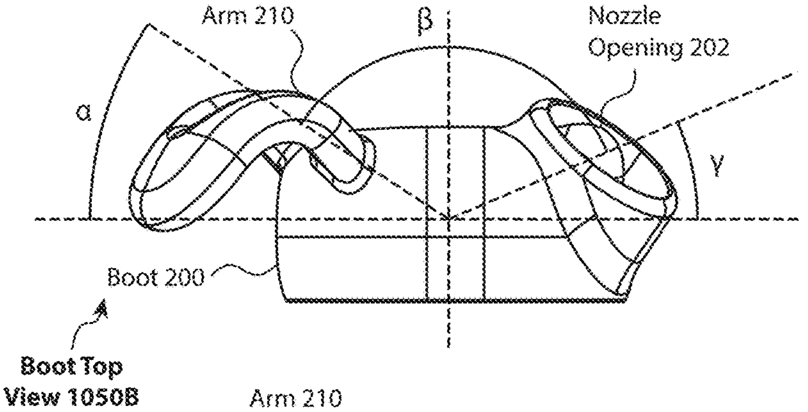
FIG. 10B illustrates a top view of the earbud of FIG. 10A, according to one or more embodiments.

FIG. 10B illustrates a boot top view 1050B of the earbud of FIG. 10A, according to one or more embodiments. FIG. 10B also illustrates the angle 50, the angle 51, and the angle 52 (denoted α, β, and γ respectively), as further shown and described in conjunction with the embodiment of FIG. 13B. The angle 52 may be defined from a central point through the center of the nozzle opening 202 when viewed from the boot top view 1050B. The angle 53 may be defined from the central point through the center of the nearest departure point of the arm 210 when viewed from the boot top view 1050B.

Figure 10C:
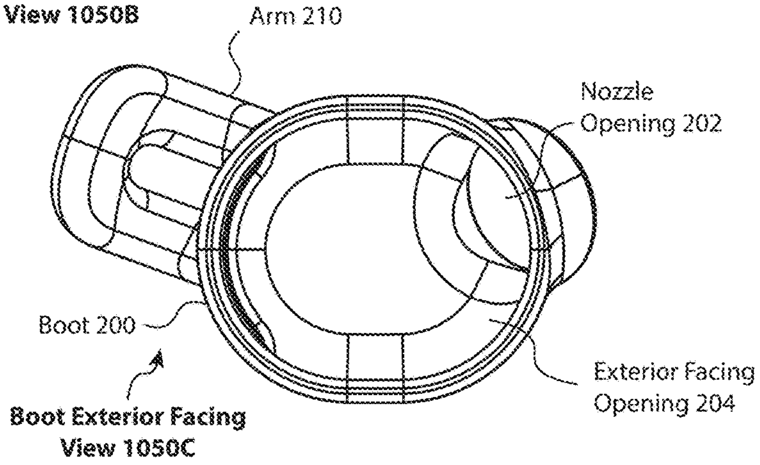
FIG. 10C illustrates an exterior facing view of the earbud of FIG. 10A, according to one or more embodiments.

FIG. 10C illustrates an exterior facing view 1050C of the boot 200 of FIG. 10A, according to one or more embodiments, including illustrating the exterior facing opening 204. It should be noted that the boot 200 may also or alternatively include an interior-facing opening, not shown, as it may be relatively common for earbuds to include interior-facing charging ports and/or other interfacing elements.

Figure 10D:
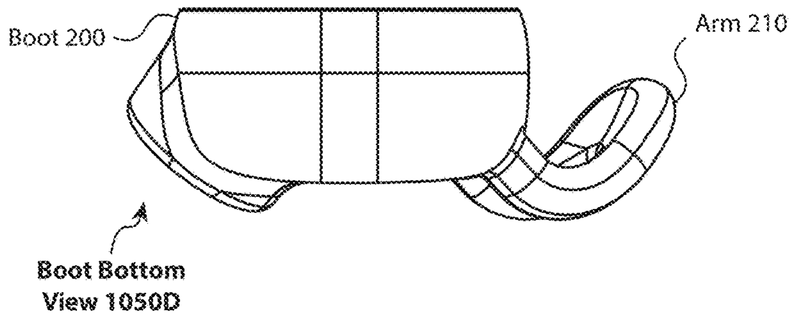
FIG. 10D illustrates a bottom view of the earbud of FIG. 10A, according to one or more embodiments.

FIG. 10D illustrates a boot bottom view 1050D of the boot 200 of FIG. 10A, according to one or more embodiments. Through comparison of FIG. 10A and FIG. 10D, it will be evident to one skilled in the art that the arm 110 such as the arm 210 may be slightly rotated in its extension from the boot 200 and/or the earbud 100, e.g., rotated out of a plane running parallel to the plane formed by the x-axis 42 and the z-axis 46, as such axes are further shown and described in conjunction with the embodiment of FIG. 13B. The rotation of the arm 110 such as the arm 210 may assist in increasing contact with the concha 20, according to one or more embodiments. In one or more embodiments, the rotation may be between and including 5 degrees to 20 degrees.

Figure 11A:
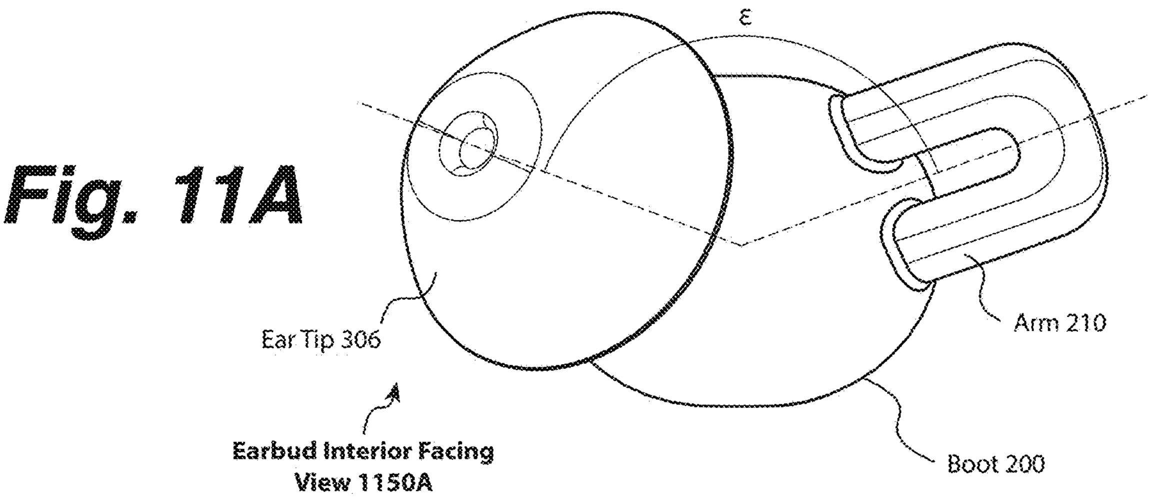
FIG. 11A illustrates an interior facing view of an earbud with the boot of FIG. 10A installed on a housing of the earbud, according to one or more embodiments.

FIG. 11A illustrates an earbud interior facing view 1150A of an earbud 300 comprising a housing 302, the boot 200, the arm 210 extending from the boot 200, and an ear tip 306, according to one or more embodiments. The earbud 300 illustrated in FIG. 11A is a right-side instance of the earbud 100. Only the angle 54, denoted 'ε', is shown for brevity to illustrate a relative angle of a central point of the earbud 300 to the arm 210 and the central point of the earbud 300 to a central point of the ear tip 306, all while viewed from the earbud interior facing view 1150A, according to one or more embodiments. In one or more embodiments, ε is between and including 120 degrees to 160 degrees.

Figure 11B:
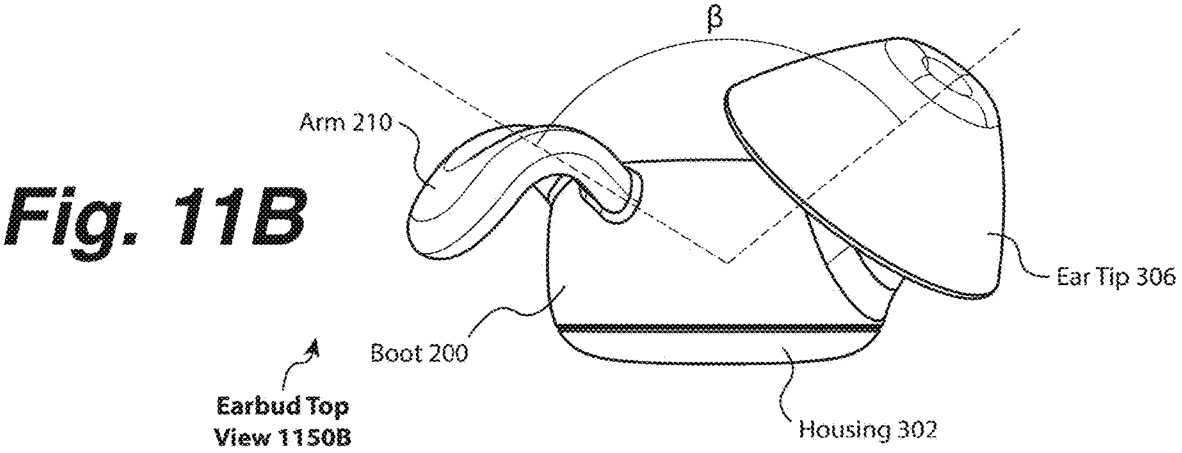
FIG. 11B illustrates a top view of the earbud of FIG. 11A, according to one or more embodiments.

FIG. 11B illustrates an earbud top view 1150B of the earbud of FIG. 11A, according to one or more embodiments. Only the angle 51, denoted 'β', is shown for brevity to illustrate a relative angle of a central point of the earbud 300 to the coupling location of the arm 210 and the central point of the earbud 300 to a central point of the ear tip 306, all while viewed from the earbud top view 1150B, according to one or more embodiments. In one or more embodiments, β is between and including 75 degrees to 110 degrees.

Figure 11C:
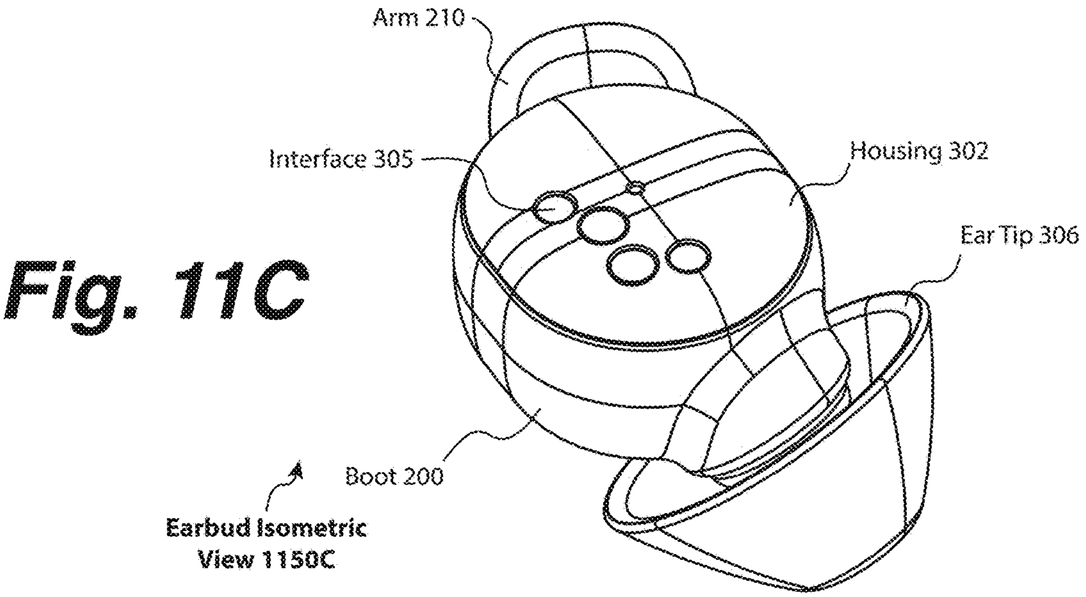
FIG. 11C illustrates an isometric view of the earbud of FIG. 11A, according to one or more embodiments.

FIG. 11C illustrates an earbud isometric view 1150C of the earbud 300 of FIG. 11A, according to one or more embodiments. FIG. 11C also illustrates an example instance of an interface 305, for example that may be utilized for charging a battery of the earbud 200, receiving audio for an external environment of the user, maintaining RF antenna connectivity with a connected device (e.g., via Bluetooth®), and/or receiving touch input from the user. The housing 302 is illustrated extending out of the boot 200, and specifically the exterior facing opening 204. The ear tip 306 is also demonstrated as including a hollow interior, bounded by an exterior surface roughly shaped as a conical section attenuated on the distal end where sound is delivered to the auditory canal 12. The edges of the conical section may assist in implementing spring-like interactions and/or a restoring force, as further shown and described in conjunction with the embodiment of FIG. 6A through FIG. 8C.

FIG. 12 illustrates an earbud positioning view 1250 illustrating positioning of an instance of the earbud 100, referred to as the earbud 400, within the ear 10 of FIG. 2, according to one or more embodiments. In one or more embodiments, the exterior of the earbud 400 may be made from a single piece of material (e.g., the housing 402) which may be rigid, semi-rigid, and/or flexible. An instance of the arm 110, shown as the arm 410, may follow the curvature of the concha 20, and specifically follow the concha 20 until transitioning to the interior-facing portion 23 of the antihelix 22. Installation of the earbud 400 may cause flexure of the arm 410 which may cause the restoring force (e.g., the restoring force 122) of the arm 410 to push off of and/or hinge away from the concha 20 and/or the interior facing portion 23 of the antihelix 22 to apply forward and/or rotational force which may push the ear tip 406 (not visible in FIG. 12 due to concealment by the tragus 14) into the auditory canal 11 (also concealed in FIG. 12). The earbud 100, such as the earbud 400, may be held within seating zone 38, as shown in FIG. 3, in a neutral position subject to restoring forces from the retainer 108, such as the retainer 408, and optionally the ear tip 106 such as the ear tip 406. The earbud 100, such as the earbud 400, may be securely retained within the conchal cavity 25 of the ear 10, while the retention mechanism and/or method may also be contained within the conchal cavity 25. As a result, the earbud 100, such as the earbud 400, may be remain comfortable, functionally, and have an increased probability of being retained, especially when various forces in up to six directions or combinations thereof are applied to the ear and/or the earbud 100. The earbud 100, such as the earbud 400, may therefore effect increased comfort and retention security, especially for certain applications such as aiding in sleep, according to one or more embodiments.

FIG. 13A illustrates an exterior facing view of the earbud of FIG. 1, including several axes of the earbud and portions of the earbud 100 that may be utilized in discussion herein, according to one or more embodiments. FIG. 13A illustrates four portions of an earbud 100, each illustrated with a broken line where indicated: a front portion 60, an aft portion 61, an interior-facing portion 62, and an exterior facing portion 63, according to one or more embodiments. The front portion 60 may include the portion of the body 102 from a frontal view, that is, the portion of the body 102 that would be visible when installed in the ear 10 of a user who is standing upright when viewing from a direction of the user's face (assuming the ear is transparent to the viewer). The aft portion 61, conversely, may include the portion of the body 102 visible from an aft view, that is, the portion of the body 102 that would be visible when installed in the ear 10 of a user who is standing upright when viewed from the back of the user's head (assuming the ear is transparent to the viewer). The interior-facing portion 62 may include the portion of the body 102 viewed from an interior-facing view when the earbud 100 is installed in the ear 10 of the user who is standing upright, that is, if one could view the earbud 100 by looking through the left side of the head of the user to the right side head of the user (assuming the head of the user is transparent to the viewer). Finally, the top portion 64 may include the portion of the body 102 viewed from an above view when the earbud 100 is installed in the ear 10 of the user is standing upright, that is, the portion of the body 102 that would be visible when installed in the ear 10 of a user who is standing when viewed from the top of the user's head (also assuming the ear is transparent to the viewer).

It should be noted that each of the portions illustrated in FIG. 13A may overlap. For example, the interior-facing portion 62 may overlap with the front portion 60, as shown in the upper-right portion of the body 102 of FIG. 13A (e.g., in a location of connection of the ear tip 106). Depending on curvature of the body 102, various portions may overlap, including without limitation a 2-way or 3-way overlap, as further shown and described herein. For example, where the body 102 is a rectangular solid with square, 90 degree corners with one face aligned frontally, then only one portion would be viewable from each angle and no overlap possible. In contrast, where the body 102 is a sphere, up to five overlapping portions may be simultaneously visible from a given angle, and, up to three simultaneous portions overlapping in one of eight hemispheric "quadrants" of the sphere, according to one or more embodiments. In one or more embodiments, the portion may also be mathematically described as quadrants, and/or polar coordinates utilized to more precisely specify relative angles or regions illustrated, described, or otherwise contemplated herein, which will be evident to one skilled in the art of product design and/or mathematics.

In one or more embodiments, a surface area location having a 2-way overlap may form an edge, whereas a location of 3-way overlap may for a corner. For example, in the embodiment of FIG. 13A, the hinge element 112 is coupled to the arm at the edge formed by the overlap of the aft portion 61 and the interior facing portion 62. In one or more embodiments, the arm 110 extends from the edge of the earbud 100 at least one of between and including the aft portion of the earbud 100 and an interior facing portion of the earbud 100.

FIG. 13A further illustrates the angle 50, the angle 51, and the angle 52, denoted α, β, and γ, respectively, that may be used to describe coupling locations of the retainer 108 and the ear tip 106, according to one or more embodiments. The angle 50, the angle 51, and/or the angle 52 may be defined from a central point of the body 102 and may be drawn to arbitrarily defined points of the retainer 108 and/or ear tip 106 when viewed from the top or bottom, for example a coupling point of the arm 110 (e.g., the hinge element 112 in FIG. 13A and/or the central sound port of the ear tip 106 for acoustical coupling to the auditory canal 12). The angle 50 may be referred to as an inward angle. The angle 51 may describe the relative angle between a location of the retainer 108 and a location of the ear tip 106 and/or nozzle 104 when viewed from the top or bottom, according to one or more embodiments.

FIG. 13A further illustrates a set of axes, including the x-axis 42 and the y-axis 44, which together may form an x-y plane. In one or more embodiments, the x-y plane may be perpendicular to the ground when the earbud 100 is installed in the ear 10 of a user who is standing upright, depending on the exact shape of the ear 10 of the user. The x-axis 42 may be perpendicular to a line running from the face of the user to the back of the user's head, whereas the y-axis 44 may run perpendicular to a line extending through the head of the user, from ear-to-ear. As shown and described in conjunction with FIG. 5, the arm 110 or portion thereof may follow a horizontal curvature when projected into the an x-y plane of the ear 10.

FIG. 13B illustrates a top view of the earbud 100 of FIG. 1, including several axes of the earbud and portions that may be utilized in discussion herein, according to one or more embodiments. Specifically, FIG. 13B further illustrates a top portion 64 of the body 102 and a bottom portion 65 of the body 102. A z-axis 46 is also illustrated, where the negative direction of the z-axis 46 may generally correspond with a direction of gravity, according to one or more embodiments.

FIG. 13B further illustrates the angle 53, the angle 54, and the angle 55, denoted δ, ε, and ζ, respectively, that may be used to describe coupling locations of the retainer 108 and the ear tip 106, according to one or more embodiments. The angle 53, the angle 54, and/or the angle 55 may be defined from a central point of the body 102 and may be drawn to arbitrarily defined points of the retainer 108 and/or ear tip 106 when viewed from the exterior facing side or interior facing side (e.g., a middle point of the terminus of the arm 110 and/or the central sound exit port of the ear tip 106 for acoustical coupling to the auditory canal 12). The angle 51 may describe the relative angle between a location of the retainer 108 and a location of the ear tip 106 and/or nozzle 104 when viewed from the exterior-facing side or interior-facing side, according to one or more embodiments. The angle 53 may also be referred to as an upward angle.

Throughout the present embodiments, and the illustrated embodiments of FIG. 1 through FIG. 13B, numerous advantages are described and/or will be evident to one skilled in the art. In one or more embodiments, an advantage includes a retainer 108 that braces the earbud in the conchal cavity 25 with a minimal number of components and/or a small size. Reduced components and/or a small size may aid in manufacturing and reduce cost. In one or more embodiments, an advantage is an ability to produce the retainer 108 out of the material of the boot 200 and/or the housing 302 of an earbud 100, which may aid in manufacturing and improve comfort by having a uniform material felt by the user against the skin of their ear 10. In one or more embodiments, an advantage includes suspending the earbud 100 within the conchal cavity 25 such that forces against anatomical elements of the ear 10, the retainer 108, the earbud 100, and/or the ear tip 106 may allow the earbud 100 to displace and then restore, including in up to six spatial directions or combinations thereof. Such a flexible response to forces 120 may improve retention security and comfort as the earbud 100 may be encouraged to return to the neutral position when the forces 120 abate. In one or more embodiments, an advantage includes a retainer 108 with an arm 110 that can hinge to collapse against the body 102 of the earbud 100, for example to reduce the probability of the arm 110 and/or other portion of the retainer 108 poking or otherwise uncomfortably interacting with the ear 10. In one or more embodiments, an advantage includes maintaining a neutral position promoting gaps on one or more sides of the earbud 100 to improve ventilation and/or evaporation of perspiration, which may increase comfort. In one or more embodiments, an advantage includes a retainer 108 that remains within the conchal cavity 25 such that the retainer 108 and/or the earbud 100 has a lower change of catching on surfaces or other material contacting and/or pressuring the ear 10. In one or more embodiments, an advantage includes a retention mechanism comprising the retainer 108 and optionally the ear tip 106 that distributes pressure on anatomical elements of the ear 10 and/or within the conchal cavity 25 when force (e.g., force 120) is applied to various portions of the ear 10, including when the ear 10 is resting on a surface and/or headwear is installed. In one or more embodiments, an advantage includes a retainer 108 that is spoon-like to grip both a horizontal and vertical contour (e.g., the 3D surface topology of the concha 20 and/or the interior facing portion 23 of the antihelix 22) to improve comfort and/or retention capability. In one or more embodiments, an advantage includes a retainer 108 that is substantially hidden within the conchal cavity 25 and/or partially hidden behind the antitragus 16 to improve aesthetics of the earbud 100 when installed in the ear of the user 10.

Although the present embodiments have been described with reference to specific example embodiments, it will be evident that various modifications and changes may be made to these embodiments without departing from the broader spirit and scope of the various embodiments.

Embodiments of the invention are discussed above with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Unless defined otherwise, all technical, engineering, and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems.

Features which are described in the context of separate embodiments may also be provided in combination in a single embodiment. Conversely, various features which are, for brevity, described in the context of a single embodiment, may also be provided separately or in any suitable subcombination. The applicants hereby give notice that new claims may be formulated to such features and/or combinations of such features during the prosecution of the present application or of any further application derived therefrom.

References to "one embodiment," "an embodiment," "example embodiment," "various embodiments," "one or more embodiments," etc., may indicate that the embodiment (s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least one or more embodiments of the invention" includes the stated particular feature, structure, or characteristic.

The enumerated listing of items does not imply that any or all of the items are mutually exclusive, unless expressly specified otherwise.

It is understood that the use of a specific component, device and/or parameter names are for example only and not meant to imply any limitations on the invention. The invention may thus be implemented with different nomenclature and/or terminology utilized to describe the mechanisms, units, structures, components, devices, parameters and/or elements herein, without limitation. Each term utilized herein is to be given its broadest interpretation given the context in which that term is utilized.

A description of an embodiment with several components in physical communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

We claim:

1. A retainer for comfortably securing an earbud in an ear of a user, the retainer comprising:

an arm extending at least partially from an aft portion of the earbud and configured to contact a concha of the ear when the earbud is seated in the ear, and a hinge element that is configured to permit at least a first portion of the arm to hinge away from the concha, wherein at least one of the first portion of the arm and a second portion of the arm follows a curvature of the concha, and wherein the hinge element resists hinging away from the concha with a restoring force, such that when the earbud is seating in the ear the arm pushes off of at least one of the concha and an interior surface of an anti-helix of the ear to apply force toward at least one of (i) a front portion of the earbud and (ii) an ear tip of the earbud, to comfortably retain the earbud.

2. The retainer of claim 1, wherein the arm comprises a flexible material configured to shear relative to the hinge element when at least one of an upward force and a downward force is applied to at least one of the earbud and the retainer, to improve comfort of the earbud if the earbud moves while seated in the ear.

3. The retainer of claim 2, wherein the retainer comprises at least one of a break zone and a break axis configured to assist in collapsing the arm at least partially against the aft portion of the earbud when at least one of a forward force is applied to the retainer and a backward force is applied to the earbud, to improve the comfort of the earbud if the earbud moves while seated in the ear.

4. The retainer of claim 1, wherein the at least one of the first portion of the arm and the second portion of the arm follows the curvature of the concha at least to the interior surface of the anti-helix of the ear.

5. The retainer of claim 4, wherein the curvature of the concha is followed by at least one of the first portion of the arm and the second portion of the arm comprises a horizontal curvature when projected into the an x-y plane of the ear.

6. The retainer of claim 1, wherein the arm extends from the earbud at an upward angle toward a top of the ear of the user when seated in the ear, wherein the arm extends from the earbud at an inward angle toward an interior of a head of the user when the earbud is seated in the ear, wherein the upward angle is between 5 degrees and 60 degrees from an x-axis of the earbud toward a z-axis of the earbud, and wherein the inward angle is between 5 degrees and 60 degrees from the x-axis of the earbud toward a y-axis of the earbud.

7. The retainer of claim 6, wherein the arm extends from an edge of the earbud at least one of between and including the aft portion of the earbud and an interior facing of the earbud.

8. An earbud comprising:

a housing of the earbud, and an arm extending at least partially from an aft portion of the earbud and configured to contact a concha of the ear when the earbud is seated in the ear, wherein the arm configured to permit at least a first portion of the arm to hinge away from the concha, wherein at least one of the first portion of the arm and a second portion of the arm follows a curvature of the concha, wherein the at least one of the first portion of the arm and the second portion of the arm follows the curvature of the concha at least to the interior surface of the anti-helix of the ear, and wherein the hinge element resists hinging away from the concha with a restoring force, such that when the earbud is seating in the ear the arm pushes off of at least one of the concha and an interior surface of an anti-helix of the ear to apply force toward at least one of (i) a front portion of the earbud and (ii) an ear tip of the earbud, to comfortably retain the earbud when the ear rests against a surface.

9. The earbud of claim 8, wherein the arm comprises a flexible material configured to flex when at least one of an upward force and a downward force is applied to at least one of the earbud and the arm, to improve comfort of the earbud if the earbud moves while seated in the ear.

10. The earbud of claim 9, wherein the arm comprises at least one of a break zone and a break axis configured to assist in collapsing the arm at least partially against the aft portion of the earbud when at least one of a forward force is applied to the arm and a backward force is applied to the earbud, to improve the comfort of the earbud if the earbud moves while seated in the ear.

11. The earbud of claim 8, wherein the arm extends from the earbud at an upward angle toward a top of the car of the user when seated in the ear.

12. The earbud of claim 11, wherein the curvature of the concha is followed by at least one of the first portion of the arm and the second portion of the arm comprises a horizontal curvature when projected into the an x-y plane of the ear.

13. The earbud of claim 11, wherein the arm extends from the earbud at an inward angle toward an interior of a head of the user when the earbud is seated in the ear, wherein the upward angle is between 5 degrees and 60 degrees from an x-axis of the earbud toward a z-axis of the earbud, and wherein the inward angle is between 5 degrees and 60 degrees from the x-axis of the earbud toward a y-axis of the earbud.

14. The earbud of claim 13, wherein the arm extends from an edge of the earbud at least one of between and including the aft portion of the earbud and an interior facing of the earbud.

15. A boot for an earbud, the boot comprising:

an arm extending at least partially away from an aft portion of the earbud when the boot is secured to the earbud, the arm configured to contact a concha of the ear when the earbud is seated in the ear and permit at least a first portion of the arm to hinge away from the concha, wherein the hinge element resists hinging away from the concha with a restoring force, such that when the earbud is seating in the ear the arm pushes off of at least one of the concha and an interior surface of an anti-helix of the ear to apply force toward at least one of (i) a front portion of the earbud and (ii) an ear tip of the earbud, to comfortably retain the earbud when the ear rests against a surface.

16. The earbud of claim 15, wherein the arm comprises a flexible material configured to flex when at least one of an upward force and a downward force is applied to at least one of the earbud and the arm, to improve comfort of the earbud if the earbud moves while seated in the ear.

17. The earbud of claim 16, wherein the arm comprises at least one of a break zone and a break axis configured to assist in collapsing the arm at least partially toward the aft portion of the earbud when at least one of a forward force is applied to the arm and a backward force is applied to the earbud, to improve the comfort of the earbud if the earbud moves while seated in the ear.

18. The earbud of claim 15, wherein at least one of the first portion of the arm and a second portion of the arm follows a curvature of the concha, and wherein the at least one of the first portion of the arm and the second portion of the arm follows the curvature of the concha at least to the interior surface of the anti-helix of the ear.

19. The earbud of claim 18, wherein the curvature of the concha is followed by at least one of the first portion of the arm and the second portion of the arm comprises a horizontal curvature when projected into the an x-y plane of the ear.

20. The earbud of claim 15, wherein the arm extends away from the earbud when the boot is secured to the earbud, wherein the arm extends away from the earbud at an upward angle toward a top of the ear of the user when seated in the ear, wherein the arm further extends away from the earbud at an inward angle toward an interior of a head of the user when the earbud is seated in the ear, wherein the upward angle is between 5 degrees and 60 degrees from an x-axis of the earbud toward a z-axis of the earbud, and wherein the inward angle is between 5 degrees and 60 degrees from the x-axis of the earbud toward a y-axis of the earbud.

* * * * *